(12) United States Patent
Zhang et al.

(10) Patent No.: US 10,991,175 B2
(45) Date of Patent: Apr. 27, 2021

(54) REPAIR MANAGEMENT SYSTEM FOR AUTONOMOUS VEHICLE IN A TRUSTED PLATFORM

(71) Applicant: Beijing Voyager Technology Co., Ltd., Beijing (CN)

(72) Inventors: Jiang Zhang, San Jose, CA (US); Xiaoyong Yi, Fremont, CA (US); Qi Chen, Burlingame, CA (US); Yu Wang, San Jose, CA (US); Fengmin Gong, Los Gatos, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 262 days.

(21) Appl. No.: 16/233,517

(22) Filed: Dec. 27, 2018

(65) Prior Publication Data
US 2020/0211301 A1 Jul. 2, 2020

(51) Int. Cl.
*H04L 29/06* (2006.01)
*G07C 5/08* (2006.01)
*B60R 16/023* (2006.01)
*H04L 12/40* (2006.01)

(52) U.S. Cl.
CPC .......... *G07C 5/0808* (2013.01); *B60R 16/023* (2013.01); *H04L 63/062* (2013.01); *H04L 63/065* (2013.01); *H04L 63/0823* (2013.01); *H04L 2012/40273* (2013.01)

(58) Field of Classification Search
CPC . H04L 63/062; H04L 63/065; H04L 63/0823; H04L 63/126; H04L 9/083; H04L 9/0833; H04L 9/3268; H04L 2209/84; G07L 5/0808; B06R 16/023
See application file for complete search history.

(56) References Cited

U.S. PATENT DOCUMENTS

2020/0159930 A1* 5/2020 Venkateswaran ..... H04L 9/0819
2020/0389453 A1* 12/2020 Kamir ................... G06F 21/554

* cited by examiner

*Primary Examiner* — Minh Dinh
(74) *Attorney, Agent, or Firm* — Kilpatrick Townsend & Stockton LLP

(57) ABSTRACT

Disclosed are techniques for securing electronic control units (ECUs) in a vehicle while allowing secure repairing of the ECUs. A method of repairing a vehicle includes disabling message authentication in secure communication between any two ECUs in a plurality of ECUs on the vehicle, detecting a first ECU that has been changed based on detecting an absence of a valid security key on the first ECU, verifying that a digital certificate associated with the first ECU is a valid certificate, generating one or more security keys for secure communication between the first ECU and a set of ECUs in the plurality of ECUs, provisioning the one or more security keys to the first ECU and the set of ECUs, and enabling the message authentication in secure communication between any two ECUs of the plurality of ECUs.

20 Claims, 12 Drawing Sheets

REPAIR MANAGEMENT SYSTEM FOR AUTONOMOUS VEHICLE IN A TRUSTED PLATFORM

CROSS REFERENCES TO RELATED APPLICATIONS

This regular U.S. patent application is being filed concurrently with U.S. patent application Ser. No. 16/233,508, filed on Dec. 27, 2018, and entitled "TRUSTED PLATFORM PROTECTION IN AN AUTONOMOUS VEHICLE", the entire content of which is incorporated by reference into this application for all purposes.

BACKGROUND

A self-driving vehicle (also referred to as an autonomous vehicle or a driverless car) is a vehicle that is capable of sensing its environment and navigating without much human input. An autonomous vehicle can be used to offer on-demand transportation service, such as acting as an unmanned taxi. Autonomous driving technology may offer many benefits, such as reducing transportation cost, reducing the needs for parking space, reducing the number of vehicles needed, reducing traffic congestion, and the like. However, there are many challenges and risks associated with autonomous vehicles, such as safety, security, and privacy issues. For example, an autonomous vehicle usually runs without being attended by an owner or driver, which opens more opportunities for attackers to physically access the vehicle and modify the hardware, firmware, and software of the autonomous vehicle.

An autonomous vehicle (AV) may include many subsystems, such as the powertrain, chassis, body, telematics, and autonomous driving subsystems. Components in each subsystem can be connected via various in-vehicle networks. For example, an autonomous vehicle is generally controlled by many electronic control units (ECUs) that are connected with the various in-vehicle networks. A malicious attacker may tamper with the ECUs within the vehicle to control the operations of the vehicle or attack other electronic components over the in-vehicle networks, such as the controller area network (CAN) bus. Thus, securing the ECUs may help to ensure the security and safety of the entire vehicle.

To protect these components, such as ECUs, many of these components can be physically housed within a vehicle compartment that is mechanically (e.g., using a mechanical lock) or electronically (e.g., using an electronic lock) secured, such that unauthorized physical access to the ECUs may be reduced or minimized. However, an attacker may still be able to access the ECUs physically or electronically to modify the hardware, firmware, and/or software of an ECU and other ECUs communicating with a compromised ECU.

BRIEF SUMMARY

Techniques disclosed herein relate to vehicle security. More specifically, and without limitation, disclosed herein are techniques for improving safety and security of hardware, firmware, and/or software of an autonomous vehicle. Techniques disclosed herein can be used to detect unauthorized changes to ECUs and prevent the ECUs that have been changed without authorization from communicating with (and thus contaminating or otherwise compromising the integrity of) other ECUs or other components in the autonomous vehicle. Techniques disclosed herein can also be used in a repair mode to securely replace, repair, upgrade, or add an ECU, and re-provision security keys to the new ECU and ECUs that communicate with the changed ECU. Various inventive embodiments are described herein, including devices, systems, methods, non-transitory computer-readable storage media storing programs, code, or instructions executable by one or more processors, and the like.

According to certain embodiments, a method of repairing a vehicle may include disabling message authentication in secure communication between any two ECUs in a plurality of ECUs on the vehicle, detecting a first ECU that has been changed based on detecting an absence of a valid security key or key pair on the first ECU, verifying that a digital certificate associated with the first ECU is a valid certificate, generating one or more security keys for secure communication between the first ECU and a set of ECUs in the plurality of ECUs, provisioning the one or more security keys to the first ECU and the set of ECUs, and enabling the message authentication in secure communication between any two ECUs of the plurality of ECUs.

In some embodiments, the secure communication between any two ECUs in the plurality of ECUs may include generating a message authentication code by a source ECU in the two ECUs based on a first security key for communication between the two ECUs, sending the message authentication code and a command by the source ECU to a destination ECU in the two ECUs, verifying the message authentication code by the destination ECU using the first security key, and executing the command by the destination ECU after verifying the message authentication code. In some embodiments, disabling the message authentication in secure communication between any two ECUs in the plurality of ECUs may include executing the command by the destination ECU regardless of a result of verifying the message authentication code or bypassing the verification of the message authentication code. In some embodiments, the method may also include requesting authorization data from a server, where disabling the message authentication in secure communication between any two ECUs in the plurality of ECUs may include disabling the message authentication in secure communication using the authorization data.

In some embodiments, detecting the first ECU that has been changed may include sending, by the key distribution center to the first ECU, an authentication request message that is encrypted or authenticated with the valid security key, and determining, by the key distribution center, that the first ECU has been changed based on determining that an authentication response message is not sent by the first ECU to the key distribution center or that the authentication response message sent by the first ECU to the key distribution center is not encrypted or authenticated with the valid security key.

In some embodiments, the key distribution center may store a security key configuration file, where the security key configuration file may indicate a number of unique security keys for secure communication between the first ECU and the set of ECUs in the plurality of ECUs. Generating the one or more security keys may include regenerating the number of unique security keys. In some embodiments, the security key configuration file may further include a list of ECUs on the vehicle, one or more security keys for each respective ECU in the list of ECUs and for secure communication between the respective ECU and other ECUs in the list of ECUs, one or more groups of ECUs, and a group key for each respective group of ECUs in the one or more groups of ECUs and for secure communication between any two ECUs in the respective group. In some embodiments, the method may also include updating, in the security key configuration file, values of the one or more security keys for secure communication between the first ECU and the set of ECUs in the plurality of ECUs.

In some embodiments, the digital certificate may indicate a first security level of the first ECU, and generating the one or more security keys may include generating the one or more security keys based on the first security level of the first ECU. In some embodiments, generating the one or more security keys based on the first security level of the first ECU may include determining that the first security level includes a highest security level, and generating, for each respective ECU in the set of ECUs and having the highest security level, a unique security key for secure communication between the first ECU and the respective ECU, where the unique security key is only used for secure communication between the first ECU and the respective ECU. In some embodiments, generating the one or more security keys based on the first security level of the first ECU may include determining that the first security level includes a highest security level, and generating an asymmetric security key pair that includes a public key and a private key, where provisioning the one or more security keys to the first ECU may include saving the private key in a full hardware security module that includes a non-volatile memory device and an asymmetric cryptographic engine on the first ECU. In some embodiments, generating the one or more security keys based on the first security level of the first ECU may include determining that the first security level includes a highest security level, selecting a subset of ECUs that has the highest security level from the set of ECUs, and determining a group key for secure communication between the first ECU and each ECU in the subset of ECUs and between any two ECUs in the subset of ECUs.

In some embodiments, generating the one or more security keys based on the first security level of the first ECU may include determining that the first security level includes a medium security level, determining a second ECU that has the medium security level from the set of ECUs, and determining a group key for secure communication between the first ECU and the second ECU and between the first ECU and a third ECU in the set of ECUs that has a security level higher than the medium security level. In some embodiments, generating the one or more security keys based on the first security level of the first ECU may include determining that the first security level includes a medium security level, and selecting a subset of ECUs that has the medium security level or a security level higher than the medium security level from the set of ECUs, and determining a group key for secure communication between the first ECU and each ECU in the subset of ECUs and between any two ECUs in the subset of ECUs. In some embodiments, generating the one or more security keys based on the first security level of the first ECU may include determining that the first security level includes a lowest security level, and determining a unique security key for secure communication between the first ECU and each ECU in the set of ECUs.

According to certain embodiments, a security system for a vehicle may include a key distribution center on the vehicle. The key distribution center may be configured to disable message authentication in secure communication between any two electronic control units (ECUs) in a plurality of ECUs on the vehicle, detect a first ECU that has been changed based on detecting an absence of a valid security key on the first ECU, verify that a digital certificate associated with the first ECU is a valid certificate, generate one or more security keys for secure communication between the first ECU and a set of ECUs in the plurality of ECUs, provision the one or more security keys to the first ECU and the set of ECUs, and enable the message authentication in secure communication between any two ECUs of the plurality of ECUs.

In some embodiments, the key distribution center is configured to detect the first ECU that has been changed by sending to the first ECU an authentication request message that is encrypted or authenticated with the valid security key, and determining that the first ECU has been changed based on determining that an authentication response message is not sent by the first ECU to the key distribution center or that the authentication response message sent by the first ECU to the key distribution center is not encrypted or authenticated with the valid security key. In some embodiments, the key distribution center may be configured to disable the message authentication in secure communication between any two ECUs in the plurality of ECUs on the vehicle by bypassing a verification of a received message or disregarding a result of the verification of the received message. In some embodiments, the key distribution center may store a security key configuration file, the security key configuration file indicating a number of unique security keys for secure communication between the first ECU and the set of ECUs in the plurality of ECUs. The key distribution center may be configured to generate the one or more security keys by regenerating the number of unique security keys, and update values of the one or more security keys in the security key configuration file.

According to certain embodiments, a system may include a processing device and a non-transitory computer-readable medium communicatively coupled to the processing device. The processing device may be configured to execute program code stored in the non-transitory computer-readable medium and thereby perform operations comprising disabling message authentication in secure communication between any two electronic control units (ECUs) in a plurality of ECUs on a vehicle, detecting a first ECU that has been changed based on detecting an absence of a valid security key or key pair on the first ECU, verifying that a digital certificate associated with the first ECU is a valid certificate, generating one or more security keys for secure communication between the first ECU and a set of ECUs in the plurality of ECUs, provisioning the one or more security keys to the first ECU and the set of ECUs, and enabling the message authentication in secure communication between any two ECUs of the plurality of ECUs.

Techniques disclosed herein may offer various improvements and advantages over existing techniques. For example, techniques disclosed herein may use multiple secure measures to authenticate both the hardware and software components and data in a vehicle and enforce secure communication between ECUs, thereby improving the safety and security of both the autonomous vehicle and the passenger. Hardware that does not pass the authentication (e.g., without a security key provisioned by the ADC of the vehicle) may be detected and reported to a security operation center, and may also be prevented from communicating with other ECUs or otherwise compromising the integrity of other ECUs. For example, the ECUs may not decode or execute malicious commands that may jeopardize the vehicle or its passengers. Therefore, the techniques may reduce or minimize safety and security issues caused by, for example, vehicles being physically or electronically attacked or modified without authorization. Furthermore, techniques disclosed herein can reduce the number of security keys used by the ECUs, and thus can reduce the memory space used to store the ECUs, thereby reducing the complexity and the cost of the trusted platform without sacrificing the security of the autonomous vehicle. Furthermore, grouping only ECUs with the same security level can prevent attackers from obtaining the group key for ECUs having a lower security level and then using the obtained group key to tamper communication between ECUs having higher security levels. In addition, the trusted platform disclosed herein can provide both security and convenience for installing a new ECU or repairing the vehicle when an ECU needs to be replaced, upgraded, or repaired.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

Aspects and features of the various embodiments will be more apparent by describing examples with reference to the accompanying drawings, in which like reference numerals refer to like components or parts throughout the drawings.

DETAILED DESCRIPTION

Figure 1:
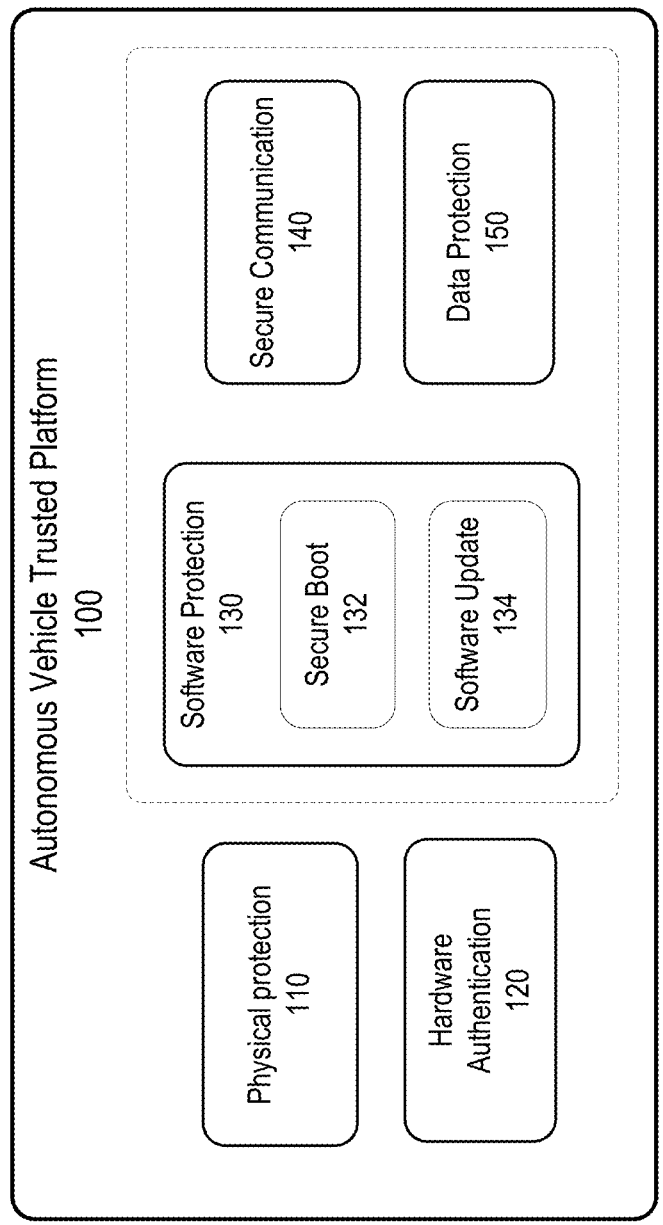
FIG. 1 illustrates an example of a trusted platform that includes some examples of security functional blocks for securing the autonomous vehicle according to certain embodiments.

Techniques disclosed herein relate to vehicle security. More specifically, and without limitation, disclosed herein are techniques for improving safety and security of hardware, firmware, software, and/or data in a vehicle, such as an autonomous vehicle. Techniques disclosed herein can be used to authenticate hardware and software, secure communication between hardware components (e.g., electronic control units (ECUs)), detect unauthorized changes to ECUs, and prevent the ECUs that have been changed without authorization from communicating with (and thus contaminating or otherwise compromising the integrity of) other ECUs or other components in the vehicle. Techniques disclosed herein can also be used in a repair mode to securely replace, repair, upgrade, add, or otherwise change an ECU on a vehicle, and re-provision security keys to the new ECU and ECUs that communicate with the new ECU. Various inventive embodiments are described herein, including devices, systems, methods, non-transitory computer-readable storage media storing programs, code, or instructions executable by one or more processors, and the like.

As described above, a vehicle, such as an autonomous vehicle, may include many subsystems, such as the powertrain, chassis, body, telematics, and/or autonomous driving subsystems. Each subsystem may include various hardware components, such as various ECUs that control the operations of the vehicle. An autonomous vehicle may include hundreds of ECUs. Each ECU may include a CPU, memory (ROM, RAM, or persistent memory), and a network communication system. ECUs in each subsystem can be connected via various in-vehicle communication networks, such as automotive Ethernet, FlexRay, controller area network (CAN), media-oriented system transport (MOST), and local interconnected network (LIN). Because autonomous vehicles usually run without being attended by an owner or driver, a malicious attacker may tamper with the ECUs within the vehicle to control the operations of the vehicle or attack other electronic components over the in-vehicle networks, such as the CAN bus. Thus, securing the ECUs can significantly improve the security and safety of the autonomous vehicles.

One technique to protect these components, such as ECUs, is to physically house these components within a vehicle compartment that is mechanically (e.g., using a mechanical lock) or electronically (e.g., using an electronic lock) secured, such that unauthorized physical access to the ECUs may be reduced or minimized. Examples of such techniques are disclosed in U.S. patent application Ser. No. 16/192,569, filed on Nov. 15, 2018, entitled "Method And System For Managing Access Of Vehicle Compartment," and U.S. patent application Ser. No. 16/192,572, filed on Nov. 15, 2018, entitled "Detection Of Unauthorized Access To Vehicle Compartments," the contents of which applications are herein incorporated by reference in their entireties for all purposes. However, an attacker may still be able to access the ECUs physically or electronically to modify the hardware, firmware, and/or software of an ECU and other ECUs communicating with the compromised ECU. For example, an attacker who gained access to the vehicle may add a hacked ECU or modify an existing ECU in the in-vehicle network to eavesdrop and/or send malicious commands to other ECUs.

According to some embodiments, a key distribution center (KDC) may be implemented in a vehicle, such as in an autonomous driving controller (ADC) of the vehicle, which may be a specialized ECU for autonomous driving in an autonomous vehicle. The KDC may first register each ECU in the vehicle with the ADC using public key infrastructure (PKI) certification-based authentication or a symmetric key for the ECU derived from a master key. The KDC may then assign and deliver different security keys to the authenticated ECUs for secure communication between ECUs. Each pair of ECUs may communicate using messages encrypted and/or authenticated using the security key(s) assigned for the communications between the pair of ECUs. Thus, the messages may not be recovered or accepted if the sending or receiving ECU does not have the valid security key or if the security key is incorrect. Each time the vehicle is powered on, the ADC may send an encrypted and/or authenticated message to each respective ECU to authenticate the ECU. An unauthorized ECU that does not have the appropriate security key may be detected and reported to a secure operation center or server via a secure communication channel.

Because a vehicle may have a hundred or more ECUs, it is unrealistic to provide a unique key pair for each pair of ECUs. In some embodiments, in order to minimize the total number of security keys for the ECUs, security keys may be assigned to the ECUs based on their security levels that are determined based on the secure levels of the hardware security modules in the ECUs and are specified in, for example, the PKI certificates of the ECUs. For example, each pair of ECUs with the highest security levels, such as the ADC and ECUs for engines, transmissions, brakes, and door locks, may be assigned with a unique symmetric key to authenticate each other, or they may directly use their own asymmetric keys to authenticate each other. ECUs with lower security levels may be grouped based on their security levels and other criteria, where ECUs in a group may share a same symmetric security key. In some embodiments, the security keys used for communication between ECUs with higher security levels may not be used by any ECUs having lower security levels, while security keys used by groups of ECUs with lower security levels may also be used by the ECUs with lower security levels to communicate with some ECUs with higher security levels.

In some embodiments, the trusted platform may also provide other security mechanisms to secure the hardware, software, and/or data in a vehicle. For example, the trusted platform may enable a secure boot on each ECU of the vehicle by verifying codes (e.g., firmware and software) used for booting the ECU. In some embodiments, the trusted platform may implement physical attack protection techniques disclosed in, for example, U.S. patent application Ser. No. 16/192,569 and U.S. patent application Ser. No. 16/192,572, as described above. In some embodiments, the trusted platform may also protect certain data that needs to be protected, such as the provisioned security keys. For example, the security keys may be stored in non-volatile memory in hardware security modules (HSM) in the ECUs. In some embodiments, an HSM may generate a local storage key for encrypting and/or authenticating data.

In some circumstances, some ECUs may need to be replaced, repaired, or upgraded, or a new ECU may need to be added to the vehicle. The above-described trusted platform includes additional features to provide both security and convenience for installing a new ECU or repairing the vehicle when an ECU needs to be replaced, upgraded, or repaired. For example, according to certain embodiments, when repair is needed to replace, repair, upgrade, or add one or more ECUs in the vehicle, a repair person (e.g., a technician or an owner of the vehicle) may first request authorization to temporarily disable the message authentication such that the vehicle may work in a repair (or maintenance) mode and the repair person can replace, repair, upgrade, or add the ECUs and test the functions of the ECUs, while keeping the vehicle working (without message authentication). The ADC or KDC in the trusted platform described above may authenticate the new (or repaired) ECUs by verifying the certificates of the new ECUs, and then, based on the security levels of the new ECUs specified in their respective certificates, the KDC may provision new security keys used by the new ECUs for communicating with other ECUs in the vehicle. The new security keys are also provisioned to other ECUs communicating with the new ECUs, such that they can authenticate each other using the new security keys after the message authentication is enabled. After re-provisioning the new security keys, the repair person may re-enable the message authentication to enforce the message authentication so that any ECU without a valid security key can be detected and prevented from communicating with other ECUs in the normal operation mode as described above.

Therefore, techniques disclosed herein may use multiple secure measures to authenticate both the hardware and software components in a vehicle and enforce secure communication between ECUs, thereby improving the safety and security of both the autonomous vehicle and the passenger. Hardware that does not pass the authentication (e.g., without a security key provisioned by the KDC of the vehicle) may be detected and reported to a security operation center, and may also be prevented from communicating with other ECUs or otherwise compromising the integrity of other ECUs. For example, the ECUs may not decode and execute malicious commands that may jeopardize the vehicle or its passengers. Therefore, the techniques may reduce or minimize safety and security issues caused by, for example, vehicles being physically or electronically attacked or modified without authorization. Furthermore, techniques disclosed herein can reduce the number of security keys used by the ECUs, and thus can reduce the memory space used to store the ECUs, thereby reducing the complexity and the cost of the trusted platform without sacrificing the security of the autonomous vehicle. Furthermore, grouping only ECUs with the same security level can prevent attackers from obtaining the group key for ECUs having a lower security level and then using the obtained group key to tamper communication between ECUs having higher security levels. In additions, the trusted platform disclosed herein can provide both security and convenience for installing a new ECU or repairing the vehicle when an ECU needs to be replaced, upgraded, or repaired.

In the following description, for the purposes of explanation, specific details are set forth in order to provide a thorough understanding of examples of the disclosure. It will be apparent that various examples may be practiced without these specific details. The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims. The figures and description are not intended to be restrictive. Circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The teachings disclosed herein can also be applied to various types of applications such as mobile applications, non-mobile application, desktop applications, web applications, enterprise applications, and the like. Further, the teachings of this disclosure are not restricted to a particular operating environment (e.g., operating systems, devices, platforms, and the like), but instead can be applied to multiple different operating environments.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Systems depicted in some of the figures may be provided in various configurations. In some examples, the systems may be configured as a distributed system where one or more components of the system are distributed across one or more networks in a cloud computing system.

Where components are described as being "configured to" perform certain operations, such configuration may be accomplished, for example, by designing electronic circuits or other hardware to perform the operation, by programming or controlling electronic circuits (e.g., microprocessors, or other suitable electronic circuits) to perform the operation, or any combination thereof.

The word "example" or "exemplary" is used herein to mean "serving as an example, instance, or illustration." Any embodiment or design described herein as "exemplary" or "example" is not necessarily to be construed as preferred or advantageous over other embodiments or designs.

People may need transportation service to travel locally or around the world. Transportation as a service or mobility as a service may be provided by transportation service providers, such as organizations (e.g., taxi companies) or individual drivers in the shared economy. Autonomous vehicles that may be able to operate and travel autonomously without a human driver have started to be developed. The capability of the autonomous vehicles may help to reduce the cost of transportation (e.g., because no human driver is used), improve the safety of transportation (e.g., due to fewer reckless drivers or drivers under the influence of alcohol or drugs), reduce the number of cars needed (e.g., because fewer cars may be idle), reduce congestion (e.g., with fewer accidents on the roads and/or fewer cars on the road), and reduce parking space needed as the autonomous vehicles may not need to stay at any destination. Because the autonomous vehicles usually run without being attended by an owner or driver, a malicious attacker may tamper with the ECUs within the vehicle to control the operations of the vehicle or attack other electronic components over the in-vehicle networks as described above. Thus, securing the ECUs may be needed for the security and safety of the autonomous vehicles.

FIG. 1 illustrates an example of a trusted platform 100 that includes some examples of security functional blocks for securing the autonomous vehicle according to certain embodiments. As illustrated, trusted platform 100 may include a physical protection system 110, a hardware authentication system 120, a software protection system 130, a secure communication system 140, and a data protection system 150. The functional blocks may be implemented in various hardware and software components of trusted platform 100, where some functional blocks may be implemented using the same hardware components. For example, some security functional blocks, such as physical protection system 110 and hardware authentication system 120, may be implemented at the vehicle level (e.g., shared by all ECUs). Some security functional blocks, such as software protection system 130, secure communication system 140, and data protection system 150, may be implemented at the ECU level (e.g., in each individual ECU).

Physical protection system 110 may protect critical components, such as some ECUs and the ADC of the vehicle, against unauthorized physical access. As discussed above, an autonomous vehicle usually runs without the attendance of an owner or driver, and thus there are more opportunities for attackers to physically access the vehicle and perform physical attacks, such as opening the hood or a secure compartment and attaching a device to the CAN bus to control the vehicle or modifying some hardware or software to control the vehicle. In some embodiments, the hood or the secure compartment may be locked, and only authorized parties can open it. For example, the administrator or owner of the vehicle can generate a one-time-use-only password for a service person to open the hood or the secure compartment via the control panel, or the administrator or owner can open the hood or the secure compartment remotely via a network connection. Sensors and alarms can also be added to detect unauthorized physical access. For example, light sensors or position sensors can be added to detect if the hood is opened or an ECU is displaced.

Hardware authentication system 120 may detect the unauthorized removal, addition, or replacement of a component, such as an ECU. In some embodiments, a master node (e.g., the ADC of the vehicle) may be authenticated by a security server (e.g., a cloud server) using a device certificate and a private key. The authenticated master node may then verify other hardware modules (e.g., ECUs or sensors) in the vehicle. For example, the master node may collect and verify the identifiers or security keys of some hardware components, such as certain ECUs and sensors. In each time when the vehicle is powered on, the master node may execute a scanning program to verify if the identifiers or security keys of the hardware components are changed. A tampered ECU may not have the right security key and thus can be detected by the master node. As such, if any hardware is replaced, added, or removed without authorization, the master node may be able to detect it.

Software protection system 130 may include a secure boot subsystem 132 and a software update subsystem 134 to secure the software running on the vehicle. When an attacker gains physical access to the vehicle, the software running on the vehicle could be tampered. In addition, the code may be modified by an attacker through wireless network connections. Thus, code authentication may be needed for the autonomous driving system and some ECUs during boot up and software update. Secure boot subsystem 132 may verify codes to detect the unauthorized changing of certain software before executing the software.

In some embodiments, secure boot subsystem 132 may verify all layers of codes, starting from system-on-chip (SoC) ROM code. For example, when powered up, the SoC of the autonomous driving system or some other ECUs may boot up from its primary boot loader stored in the on-chip ROM, where the ROM code may not be modifiable. The primary boot loader may load a secondary boot loader from a flash memory into a RAM and verify the signature of the secondary boot loader using a fused key or key hash, where the fused key may be stored in an SoC and may not be modifiable. Once the secondary boot loader is verified, it may be executed to load a universal boot loader (U-Boot) from a flash memory into RAM and verify the signature of the U-Boot using the hard-coded key in the secondary boot loader or using the fused key. Once verified, the U-Boot may be executed to verify the Kernel, and the verified kernel may in turn verify the applications using the hardcoded key before running the applications.

Software update subsystem 134 may facilitate secure updates or fix of software. For example, if a security bug is found in a deployed software, software update subsystem 134 may update the software over-the-air (OTA) without calling back the vehicles. In some cases, vehicle vendors may have a software update system for ECUs. In some embodiments, if the vehicle does not support the OTA update, an OTA software update client of software update subsystem 134 can download the software update to the ADC or a gateway and then pass the software update to the ECUs for software update on the ECUs.

Data protection system 150 may protect some data, such as security keys or other confidential information that may need to be authenticated and/or encrypted. The ADC and some ECUs may include hardware security modules (HSMs) that have internal non-volatile memory (NVM) and/or flash memory to securely store the keys. In some embodiments, in order to protect other data stored in external flash memory, the HSM may randomly generate a unique local storage key to encrypt and/or authenticate the data. Because the local storage key of each device (e.g., ECU) is unique, the protected data may only be decrypted or authenticated on the corresponding device, and data copied from one device may not be decrypted or authenticated by another device.

Secure communication system 140 may enable secure communication between ECUs by protecting the messages exchanged between ECUs. Communications involving autonomous vehicles may include in-vehicle communications and vehicle-to-external-world communications. The in-vehicle communications may be used to transmit vehicle control commands. Some commands may not need encryption, but may need to be authenticated to prevent spoofing commands. In some embodiments, counters and message authentication checksums (MACs) may be used to authenticate in-vehicle messages and avoid executing stale commands. For external communication, protocols such as transport layer security (TLS), may be used to authenticate the entities and/or messages. For both in-vehicle and external communications, security keys may be provisioned to the ECUs and ADC during vehicle production or before adding the vehicle to the fleet. After the security keys are provisioned, the ADC and ECUs may use the HSM to store and protect these security keys for long-term use. More details of the security key provisioning and secure communication are described below.

Figure 2:
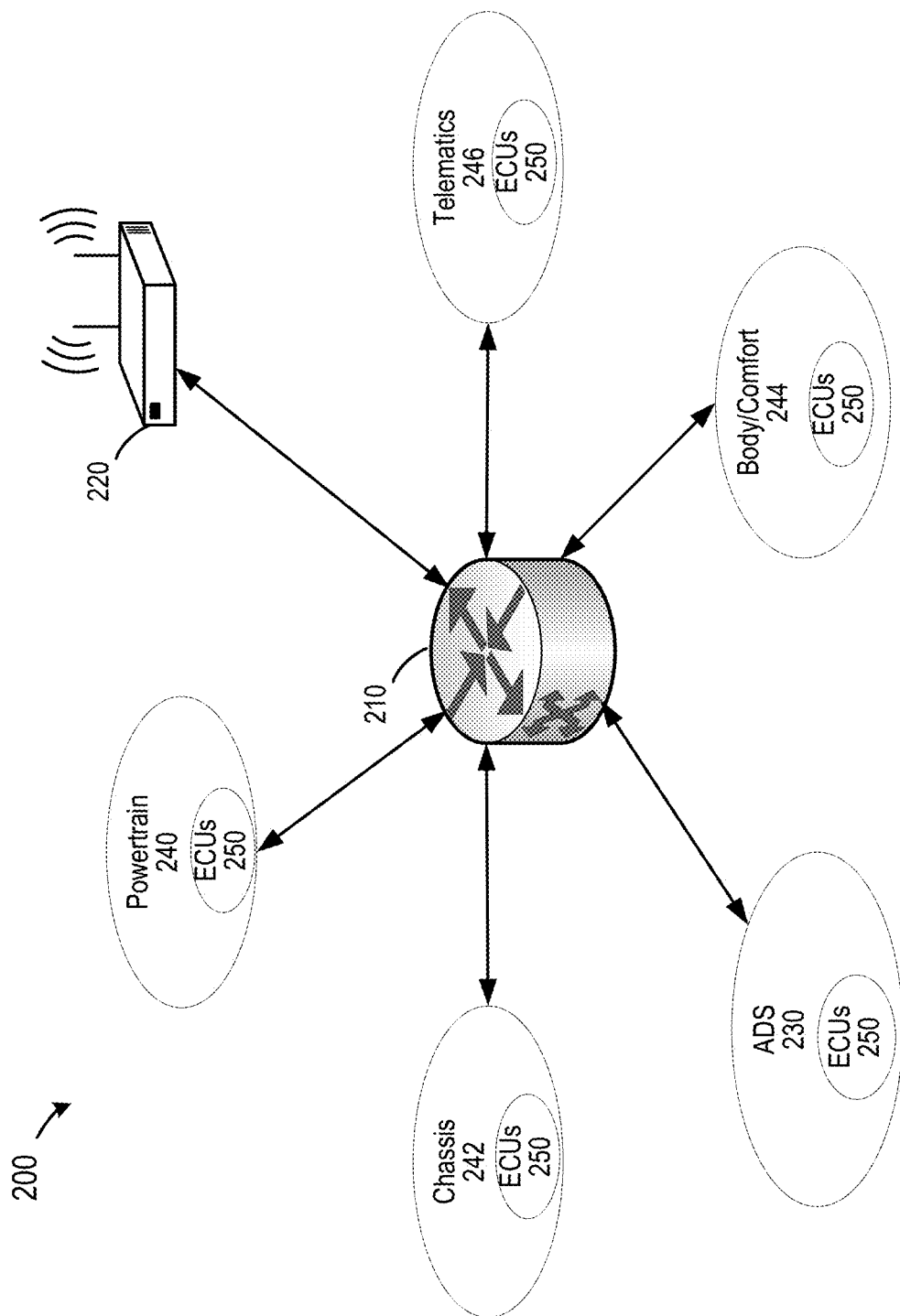
FIG. 2 illustrates an example of a network architecture in an autonomous vehicle according to certain embodiments.

FIG. 2 illustrates an example of a network architecture 200 in an autonomous vehicle according to certain embodiments. As described above, an autonomous vehicle may include a network of ECUs that may include hundreds or more of ECUs connected together to control the operations of the autonomous vehicle. The ECUs and other electronic components, such as some sensors, detectors, and actuators, may communicate via an in-vehicle network, such as automotive Ethernet, FlexRay, Controller Area Network (CAN), media-oriented system transport (MOST), and local inter-connected network (LIN). The ECUs may be distributed in various subsystems or locations in the vehicle. A platform backbone may connect all the subsystems together via automotive Ethernet or FlexRay.

As illustrated in FIG. 2, an autonomous vehicle may include several subsystems, such as an autonomous driving system (ADS) 230, a powertrain subsystem 240, a chassis subsystem 242, a body/comfort subsystem 244, and a telematics subsystem 246. ADS 230 may include sensors (such as cameras, LIDARs, radars, and the like), communication modules, and the autonomous driving controller (ADC). The ADC may collect information from the sensors and issues commands to other ECUs to operate the vehicle. The ADC can also receive instructions from a cloud server. For example, the ADC may use V2X for communications between the vehicle and the external world. Powertrain subsystem 240 may include the engine, transmission, and the like. Chassis subsystem 242 may include the steering, brake, and the like. Body/comfort subsystem 244 may include door locks, seats control, windows control, sunroof, climate control, and the like. Telematics subsystem 246 may include the radio system, video system, interface with mobile phones, infotainment, GPS, and the like. Each of these subsystems may include a plurality of ECUs 250.

These subsystems in the autonomous vehicle, and more specifically, ECUs 250 in these subsystems, may be connected to a gateway 210 to isolate ECUs in different subsystems or domains. Gateway 210 may also provide isolations of ECUs from the external network. In some embodiments, firewalls may be used in gateway 210 to block unwanted connections and data traffic. Gateway 210 may be connected to a connectivity subsystem 220 for connecting to the external world using WiFi, Cellular networks, Near Field Communication (NFC), Bluetooth Low Energy (BLE), or other suitable wireless communication protocols. Connectivity subsystem 220 may support and enable the security of communication protocols including WiFi, NFC, and BLE. For Internet connections, TLS with mutual authentication may be applied to prevent unauthorized connectivity. In some embodiments, firewalls and/or virtual private networks (VPNs) may also be used in connectivity subsystem 220.

As described above, ECUs 250 may need to be authenticated to detect any ECUs that may have been removed, replaced, or added without authorization. Each ECU 250 may include a computer system that may include a processor, memory (ROM, RAM, and/or persistent memory), and a network communication system. Any of these components of an ECU may be modified without authorization. For example, instruction code stored in the memory may be changed or the memory may be replaced.

Figure 3:
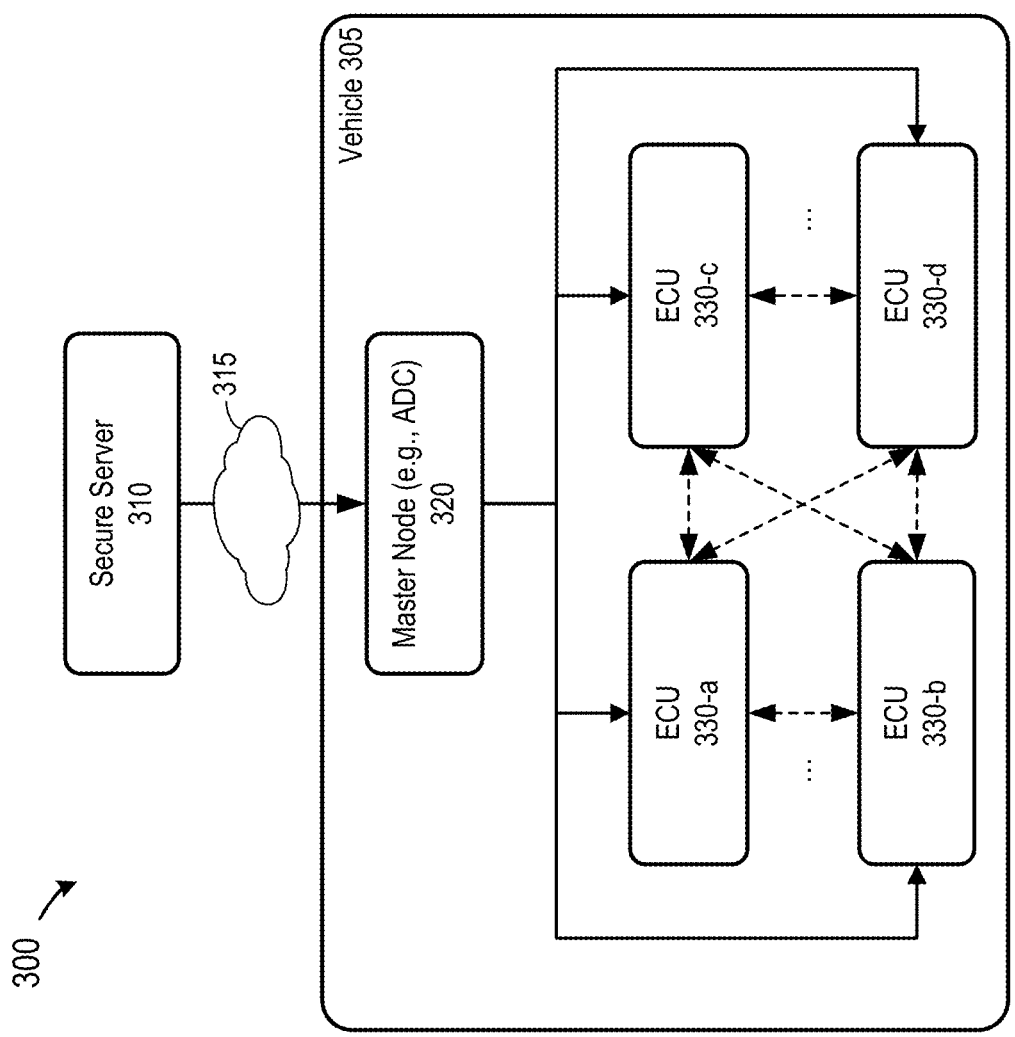
FIG. 3 illustrates an example of a system environment for authenticating hardware in autonomous vehicles according to certain embodiments.

FIG. 3 illustrates an example of a system environment 300 for authenticating hardware in autonomous vehicles according to certain embodiments. System environment 300 may include a secure server 310 (e.g., a cloud-based server) and a vehicle 305. As illustrated, secure server 310, which may be maintained by a transport service provider as part of a secure operation center, may first authenticate a master node 320 (e.g., an ADC) in vehicle 305 through a wireless communication network 315. In some embodiments, secure server 310 may authenticate master node 320 using a device certificate and a private key. The authenticated master node 320 may then authenticate ECUs 330-a, 330-b, 330-c, 330-d, and the like (collectively ECUs 330), using certificates issued by a certification authority and stored in ECUs 330. In some embodiments, master node 320 may obtain the device certificate and the private key from a provision center, which may be different from security server 310 or may be a part of security server 310. In some embodiments, the authenticated master node 320 may also provision security keys to authenticated ECUs 330 as described in details below.

In each time when the vehicle is powered up, master node 320 can be verified by secure server 310, and master node 320 may then verify and enumerate or otherwise register ECUs 330 in the vehicle using the assigned security keys. For example, when the vehicle is powered on, master node 320 may execute a scanning program to verify if the security keys of ECUs 330 are changed. Master node 320 may also check if any ECU in a configuration file maintained by master node 320 is missing and if any new ECU has been added. A tampered ECU 330 or a new ECU may not have the right security key and thus may be detected by the master node during the scanning. As such, if any ECU 330 is replaced, added, or removed without authorization, master node 320 may be able to detect it when vehicle 305 is powered up.

During operations of the vehicle, ECUs 330 may communicate with each other or with master node 320 using the security keys assigned to them. In some embodiments, a unique security key (e.g., a symmetric key) may be assigned to each pair of ECUs 330 such that the pair of ECUs 330 may securely exchange messages encrypted and/or authenticated using the unique security key or its own asymmetric security key pair. Other ECUs may not have the unique security key or security key pair and thus may not eavesdrop on the encrypted messages, or may not act as one of the ECUs in the pair to command the other ECU by sending encrypted or authenticated messages to the other ECU. In some embodiments, master node 320 may assign a pair of asymmetric security keys to a pair of ECUs that may need a high security level. In some embodiments, as described in more detail below, a security key may be used by a group of ECUs 330 for secure communication.

Figure 4:
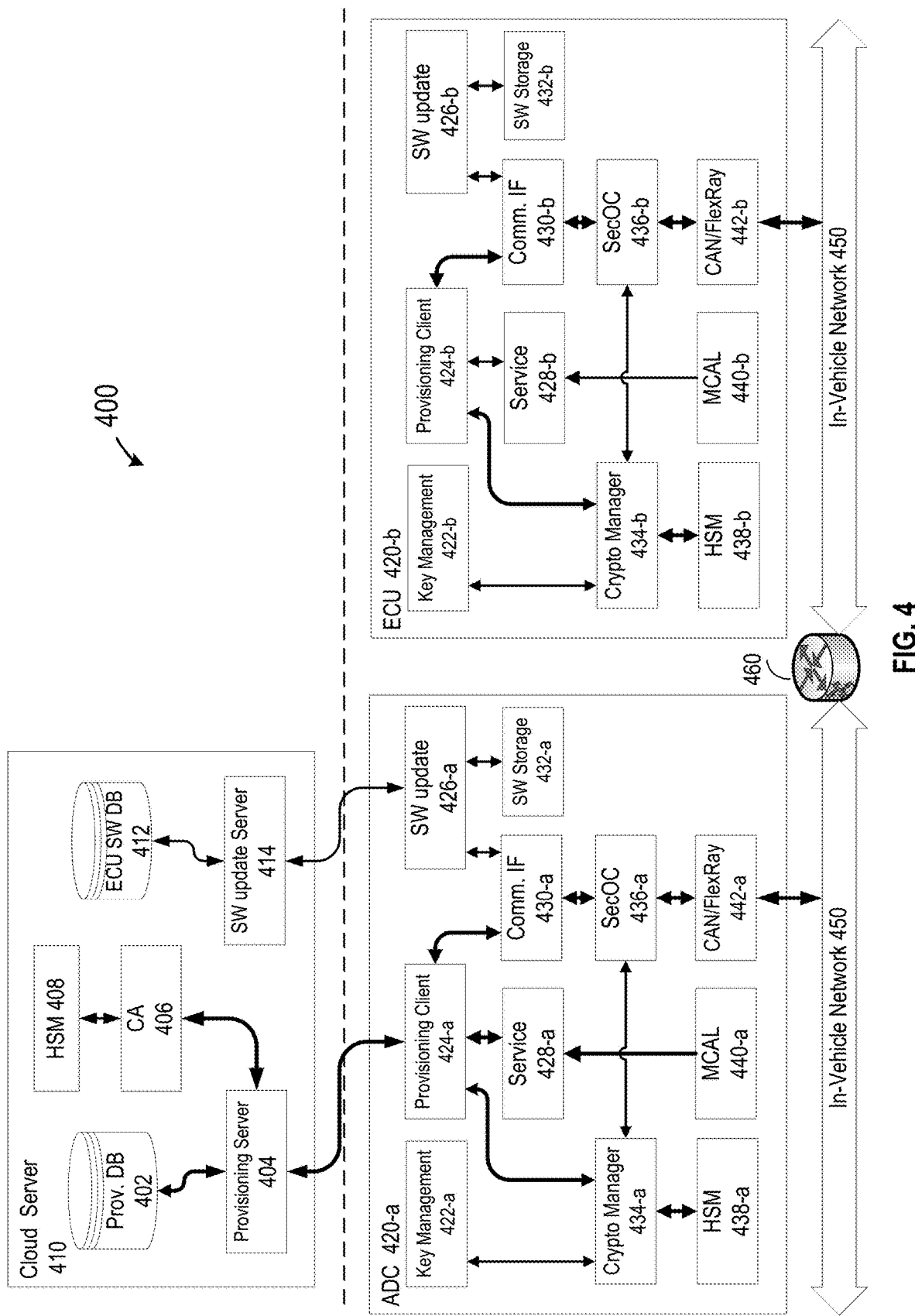
FIG. 4 illustrates an example of a system environment including a trusted platform for securing hardware, software, and data in an autonomous vehicle according to certain embodiments.

FIG. 4 illustrates an example of a system environment 400 including a trusted platform for securing hardware, software, and data in an autonomous vehicle according to certain embodiments. System environment 400 may be used, for example, for key provisioning, software verification, software updates, and the like. In the example shown in FIG. 4, system environment 400 includes a cloud server 410 and a vehicle that includes an ADC 420-a and one or more ECUs 420-b.

In some embodiments, each autonomous vehicle may include a key distribution center (KDC) for registering each ECU and establishing security keys for each ECU during key provisioning. The KDC may perform ECU registration and key provisioning before the autonomous vehicle is released from production and added to a fleet. The KDC may be hosted in an ADC, such as ADC 420-a. The ECU registration can be based on PKI certificate authentication. An ECU, such as ECU 420-b, can be registered if it can provide a valid PKI certificate issued by a valid certificate authority. The certificate may include the ECU's security level (e.g., hardware security module (HSM) level). In some embodiments, the KDC may assign different security key(s) to the ECU based on the security levels of the ECUs. For example, the security key(s) may be for full HSM, medium HSM, or light HSM security level. In some embodiments, in order to minimize the total number of security keys, the ECUs can be grouped in different groups based on their security levels, and ECUs in a group may share security keys as described in detail below.

In the example shown in FIG. 4, a vendor, owner, or operator of an autonomous vehicle may have a provisioning server in cloud server 410. The provisioning server can be used to provision certificates and/or security keys to ADCs and/or ECUs. The provisioning server may include a provisioning database 402, a provisioning server 404, a certificate authority (CA) 406, and an HSM 408. Provisioning database 402 may store provisioning data, such as identifications (IDs) of ADCs and/or ECUs, and the certificates and/or security keys provisioned to ADCs and/or ECUs. HSM 408 may store signing key(s) used by CA 406 to sign the certificates. CA 406 may generate a digital certificate for an ADC using the signing key(s) stored in HSM 408, and generate a key pair for the ADC (e.g., ADC 420-a). The digital certificate and the key pair may be used later for authenticating the ADC and for secure communication between cloud server 410 and the ADC. Provisioning server 404 may receive a provisioning request from an ADC, send the ID of the ADC (or the vehicle) to provisioning database 402 (which may parse the ID and retrieve provisioning data), get the digital certificate and security key pair for the ADC from certificate authority (CA) 406, and respond to the provisioning request with the digital certificate, security key pair, and other provisioning data.

ADC 420-a may be a special ECU, and may include a key management module 422-a, a provisioning client 424-a, a service unit 428-a, a crypto manager 434-a, a microcontroller abstraction layer (MCAL) 440-a, and an HSM 438-a (e.g., a full HSM). ADC 420-a may also include a communication interface 430-a, a secure onboard communication (SecOC) system 436-a, and a CAN or FlexRay network interface 442-a that may communicate with an in-vehicle network 450 (e.g., a CAN or FlexRay network). Similarly, ECU 420-b may also include a key management module 422-b, a provisioning client 424-b, a service unit 428-b, a crypto manager 434-b, an MCAL 440-b, and an HSM 438-b. ECU 420-b may also include a communication interface 430-b, a SecOC system 436-b, and a CAN or FlexRay network interface 442-b that may communicate with in-vehicle network 450 (e.g., a CAN or FlexRay network).

During the provisioning, provisioning client 424-a in ADC 420-a may collect information of ADC 420-a and/or the vehicle, such as the vehicle ID, ADC serial number and model, and the like, from MCAL 440-a through service unit 428-a, and send information of ADC 420-a and/or the vehicle in a request to provisioning server 404 on cloud server 410. As described above, provisioning server 404 may send the information of ADC 420-a and/or the vehicle to provisioning database 402, which may retrieve provisioning data based on the information of ADC 420-a and/or the vehicle (e.g., vehicle ID), and send the provisioning data to provisioning server 404. Provisioning server 404 may also send the ADC and/or vehicle information to CA 406, which may generate the digital certificate for ADC 420-a using the signing key(s) stored in HSM 408 and may also generate a security key pair for ADC 420-a. Provisioning server 404 may then respond to the provisioning request from provisioning client 424-a with the retrieved provisioning data, the digital certificate, and the security key pair for ADC 420-a. The response from provisioning server 404 may be encrypted or authenticated. Upon receiving the digital certificate and the security key pair, provisioning client 424-a may send the digital certificate and the security key pair to crypto manager 434-a to decrypt or authenticate the security key pair. The decrypted or authenticated security key pair may be saved in HSM 438-a. In some embodiments, ADC 420-a may generate its own asymmetric key pair and send the public key to CA 406, which may then issue the digital certificate to ADC 420-a.

Provisioning client 424-a may then start to generate and assign security keys for ECUs (e.g., ECU 420-b) associated with ADC 420-a and having a valid PKI certificate issued by, for example, CA 406. The assigned security key(s) for ECU 420-b may be sent to in-vehicle network 450 through communication interface 430-a, SecOC system 436-a, and CAN or FlexRay network interface 442-a. The assigned security key(s) for ECU 420-b may then be sent by a gateway 460 and in-vehicle network 450 to the subsystem or domain that includes ECU 420-b. CAN or FlexRay network interface 442-b, SecOC system 436-b, and communication interface 430-b may forward the assigned security key(s) for ECU 420-b to provisioning client 424-b in ECU 420-b. Provisioning client 424-b may send the received security key(s) to crypto manager 434-a to decrypt or authenticate the security key(s) and save the decrypted or authenticated security key(s) in HSM 438-b. ECU 420-b may then use the security key(s) later for communicating with ADC 420-a and other ECUs.

The provisioned security keys are generally intended for long-term use. In order to protect these provisioned security keys, ADCs and ECUs may include a hardware security module (HSM) that includes persistent memory to store and protect the provisioned security keys. There may be many different embodiments of HSMs for different security levels, such as full HSM, medium HSM, and light HSM. Some examples of HSMs having different configurations for different security levels defined by E-safety Vehicle Intrusion Protected Application (EVITA) project are shown in Table 1. It is noted that even though three security levels are described in Table 1 and some other examples in the present disclosure, ECUs in a vehicle can be categorized into different numbers of security levels in different embodiments. For example, in some embodiments, each ECU in a vehicle can be categorized into one of two different security levels. In some embodiments, each ECU in a vehicle can be categorized into one of four or more different security levels.

TABLE 1

Examples of HSMs having different configurations for different security levels

| | Full EVITA HSM | Medium EVITA HSM | Light EVITA HSM |
|---|---|---|---|
| Internal RAM | ✓ (e.g. 64 kByte) | ✓ (e.g. 64 kByte) | optional |
| Internal NVM (Non-volatile memory) | ✓ (e.g. 512 kByte) | ✓ (e.g. 512 kByte) | optional |
| Symmetric Cryptographic Engine (e.g. AES-128 CCM, GCM f/AE) | ✓ | ✓ | ✓ |
| Asymmetric Cryptographic Engine (e.g. ECC-256-GF(p) NIST FIPS 186-2 prime field) | ✓ | | |
| Hash engine (e.g. Whirlpool) | ✓ | | |
| Counters | ✓ (e.g. 16 × 64-bit monotonic counter) | ✓ (e.g. 16 × 64-bit monotonic counter) | optional |
| Random Number Generator | ✓ (e.g. AES-PRNG with TRNG seed) | ✓ (e.g. AES-PRNG with TRNG seed) | optional |
| Secure CPU (e.g. ARM Cortex-M3 32 bit, 50-250 MHz) | ✓ | ✓ | |
| Hardware Interface | ✓ | ✓ | ✓ |

After the keys are provisioned to the ADC and ECUs in a vehicle, the ADC can use the keys and authentication messages to authenticate the ECUs when needed. For example, when the vehicle is powered on, secure communication may be established between the ADC and a secure operation center (SOC) on the cloud server via mutual authentication using security keys such that the SOC can authenticate the ADC. In one example, the authenticated ADC can send an authentication message to each respective ECU via secure communication to verify each respective ECU's authenticity. ECUs without the appropriate security keys may not be able to decrypt or authenticate the message and thus may not respond properly. Therefore, the ADC can detect any ECU that does not have the assigned security key for secure communication with the ADC, and can then report the authentication results to the SOC via secure communication.

In some embodiments, system environment 400 may also be used for software updates. As illustrated in FIG. 4, cloud server 410 may include a software update server 414 and a ECU software database 412. ADC 420-a may include a software update client 426-a and a software storage 432-a. Similarly, ECU 420-b may also include a software update client 426-b and a software storage 432-b. To update software, software update client 426-a in ADC 420-a may initiate a secure tunnel with software update server 414 in cloud server 410 using two-way authentication to download the appropriate software update image file from ECU software database 412. ADC 420-a may use a code signing certificate to verify the signature of the downloaded software update image file. The method to verify the downloaded software update image file may be similar to the method used in secure boot. After the downloaded software update image file is verified, the software update image file may be saved to software storage 432-a and the update may be deployed on ADC 420-a if the update is for ADC 420-a. If the update is for ECU 420-b, message authentication checksum (MAC) may be generated for the software update image file, and the software update image file and the MAC may be sent to ECU 420-b through communication interface 430-a, SecOC system 436-a, and CAN or FlexRay network interface 442-a, in-vehicle network 450, gateway 460, and CAN or FlexRay network interface 442-b. SecOC system 436-b in ECU 420-b may verify the MAC using crypto manager 434-b and the security key stored in HSM 438-b, and then send the verified software update image file through communication interface 430-b to software update client 426-b and software storage 432-b for deploying on ECU 420-b.

As described above, after the security keys are provisioned, the ADC and the ECUs may use the provisioned keys for secure communication during operations of the vehicle. For example, a message (which may be referred to as a protocol data unit (PDU)) to be sent from a source ECU to a destination ECU may be encrypted or authenticated by the source ECU using a security key generated for and assigned to the pair of ECUs. The destination ECU, after receiving the encrypted or authenticated message, may decrypt or authenticate the message using the corresponding security key.

Figure 5:
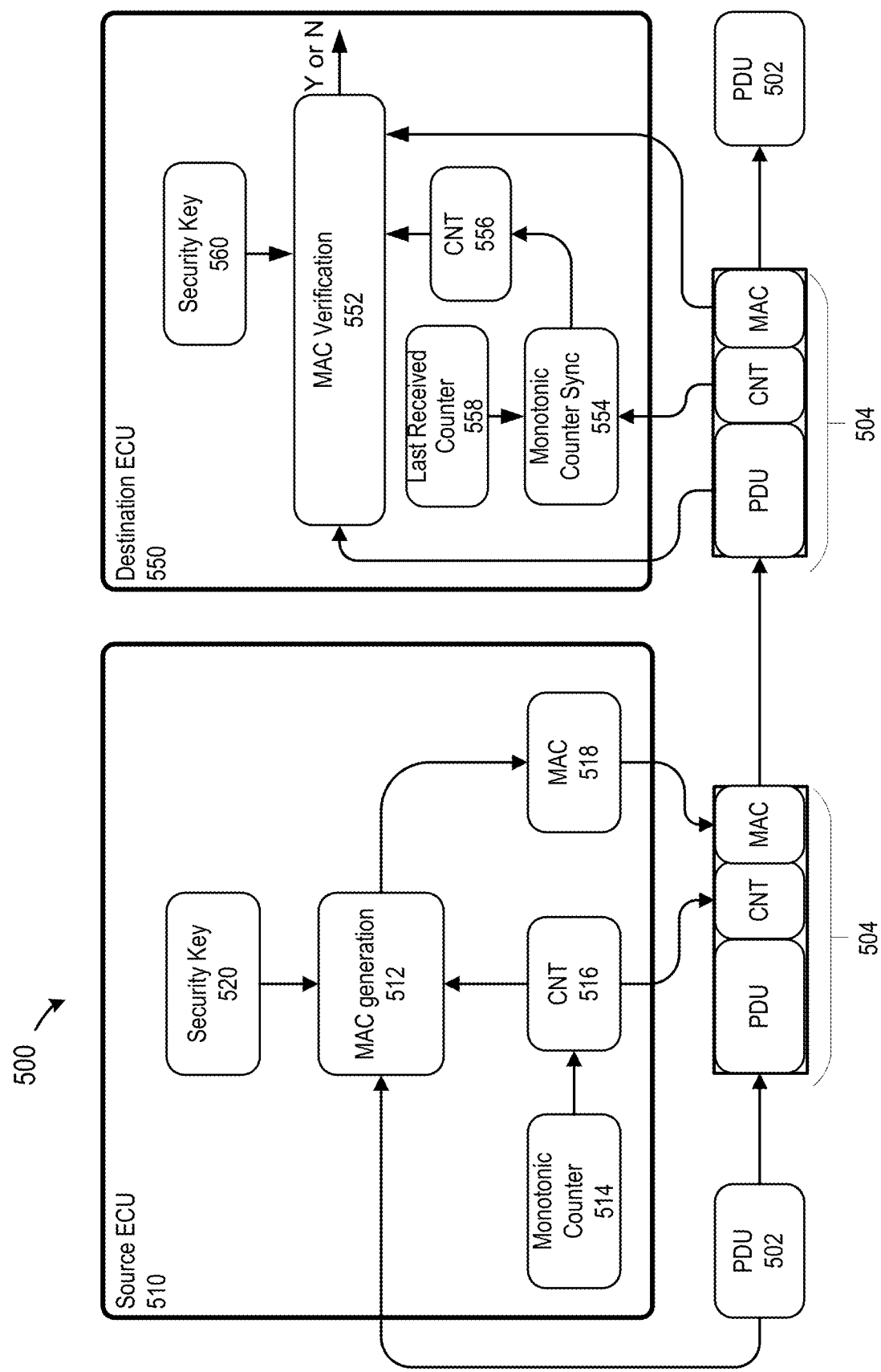
FIG. 5 is a block diagram illustrating an example of a system for secure communication between a pair of ECUs in a vehicle according to certain embodiments.

FIG. 5 is a block diagram illustrating an example of a system 500 for secure communication between a pair of ECUs in a vehicle according to certain embodiments. The pair of ECUs may include a source ECU 510 and a destination ECU 550 that are connected through in-vehicle network as described above. In some examples, one of source ECU 510 and destination ECU 550 may be an ADC. As illustrated, source ECU 510 may include a message authentication checksum or code (MAC) generation unit 512, a memory that stores a security key 520, and a monotonic counter 514. Destination ECU 550 may include a MAC verification unit 552, a memory that stores a security key 560, and a monotonic counter synchronization unit 554.

To securely send a PDU 502 (e.g., a command) to destination ECU 550, MAC generation unit 512 in source ECU 510 may add authentication information to PDU 502. The authentication information may include an authenticator (e.g., a MAC) and a freshness value. For example, MAC generation unit 512 may take PDU 502 and a counter value 516 from monotonic counter 514, and generate a MAC 518 using PDU 502, counter value 516, and security key 520. Counter value 516 (or a truncated version of counter value 516) and MAC 518 (or a truncated version of MAC 518) may be added to PDU 502 (i.e., the payload) to form an authenticated or encrypted message 504. Counter value 516 may indicate the "freshness" of authenticated or encrypted message 504 such that a command may only be executed at the intended time and a stale command may not be executed. MAC 518 may provide a high level of confidence that the data in authenticated or encrypted message 504 is generated by a legitimate source and is provided to the destination ECU at the time in which it is intended for. In some embodiments, before sending authenticated or encrypted message 504, counter value 516 may be exchanged between source ECU 510 and destination ECU 550. As described above, a symmetric key may have been provided to (or exchanged) between source ECU 510 and destination ECU 550 before authenticated or encrypted message 504 is sent.

After receiving authenticated or encrypted message 504 through the in-vehicle network, destination ECU 550 may check the freshness and authenticity of authenticated or encrypted message 504 by verifying the authentication information (e.g., the counter value and/or the MAC) that has been appended to the payload (e.g., PDU 502). For example, destination ECU 550 may use monotonic counter synchronization unit 554 and a previous received counter value 558 to determine a counter value 556. MAC verification unit 552 may verify authenticated or encrypted message 504 using security key 560, counter value 556, and the MAC in authenticated or encrypted message 504. After the verification, the payload (i.e., PDU 502) in authenticated or encrypted message 504 may be accepted by destination ECU. For example, if PDU 502 includes a command or instruction to destination ECU 550, destination ECU 550 may execute based on the command or instruction.

In general, it may be more efficient to use symmetric keys, rather than asymmetric keys (e.g., a public key), for in-vehicle communication. For maximum security, it may be desirable to assign a unique security key to each respective pair of ECUs in a vehicle in order to achieve the highest security level. However, as described above, an autonomous vehicle may include a hundred or more ECUs (e.g., about 300 to about 500 ECUs). Thus, generating and saving a unique symmetric key for each respective pair of ECUs may not be realistic or practical due to the non-volatile storage space (e.g., HSMs) needed to permanently store the keys. To reduce the total number of security keys for the ECUs, security keys may be assigned to the ECUs based on their security levels that are specified in, for example, the PKI certificates of the ECUs. For example, asymmetric security keys can be assigned to ECUs with the highest security levels and having the computing power for asymmetric key cryptography (e.g., ECUs 250 in powertrain subsystem 240, chassis subsystem 242, or body/comfort subsystem 244, such as ECUs for the engine, transmission, brakes, and door locks), and ECUs with lower security levels may be grouped based on their security levels and other criteria, where ECUs in a same group may share a same symmetric security key. In some embodiments, the security keys for communications between ECUs with higher security levels may not be used by any ECUs having lower security levels, while security keys used by groups of ECUs with lower security levels to communicate with each other may also be used by the ECUs with the lower security levels to communicate with some ECUs with higher security levels.

Figure 6:
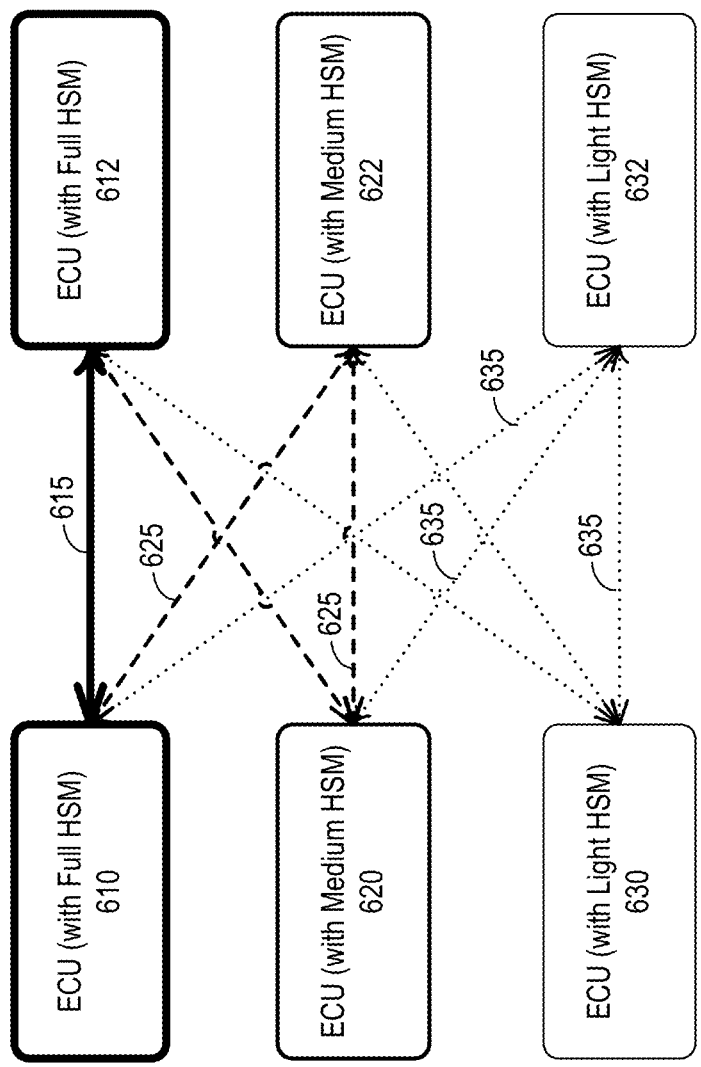
FIG. 6 illustrates an example of assigning security keys to groups of ECUs based on their security levels according to certain embodiments.

FIG. 6 illustrates an example of assigning security keys to groups of ECUs based on their security levels according to certain embodiments. As described above, ECUs may have different security levels, which may be specified in their certificates. For example, some ECUs in the ADS subsystem, powertrain subsystem, and chassis subsystem, such as ECU 610 and ECU 612, may need higher security levels, while some ECUs in the telematics subsystem (e.g., ECU 630 and ECU 632) may need lower security levels. To reduce the total number of security keys (and thus the non-volatile memory space used by the security keys), some ECUs may be grouped based on, for example, their security levels, and a unique group key may be assigned to each respective group such that ECUs in the same group may communicate with each other using the same group key. The group key may be a symmetric security key. A group key used for communications between ECUs having a higher security level may not be used by any ECUs having lower security levels, while the group key used for communications between ECUs having a lower security level may also be used by the ECUs with the lower security level to communicate with ECUs having higher security levels.

In the example shown in FIG. 6, ECUs 610 and 612 may have the highest security level, and a respective asymmetric security key pair may be assigned to each of ECUs 610 and 612 for communications between ECUs 610 and 612. Thus, in some embodiments, ECUs 610 and 612 may both include a full HSM that includes an asymmetric cryptographic engine or a hash engine as shown in Table 1 above to support authentication or encryption using asymmetric key pairs. When ECUs 610 and 612 communicate with each other, they may use the asymmetric key pairs to authenticate each other and then use a key exchange technique to obtain a new session key 615 (which is a symmetric key) to authenticate and/or encrypt the messages. A different session key 615 may be obtained for each communication session. In some embodiments, because using the asymmetric keys to exchange session key 615 may not be efficient, a unique symmetric key may be assigned to ECUs 610 and 612 so that they can use the symmetric key to exchange the session key or they can directly use the symmetric key to protect messages. Symmetric session key 615 may not be used by any ECUs other than ECU 610 or 612 in the vehicle. In some embodiments, for ECUs (e.g., the ADC and some ECUs associated with the engine, transmission, acceleration, brake, and locks) having full HSMs that can support cryptography using asymmetric keys, both symmetric keys and asymmetric keys may be provisioned.

ECU 620, ECU 622, and other ECUs that may have a medium security level may be grouped together to share a single symmetric group key 625. Thus, ECUs 620 and 622 may include a medium HSM to store group key 625. The medium HSM may not need to support asymmetric key encryption and decryption (or authentication) as shown in Table 1 above. Group key 625 may be used by any ECU in the group including ECU 620 to communicate with any other ECUs in the group. In some embodiments, group key 625 may also be provisioned to ECUs having higher security levels (e.g., ECUs 610 and 612), and thus group key 625 may also be used by any ECU in the group (e.g., ECU 620 or 622) to securely communicate with the ECUs having higher security levels (e.g., ECUs 610 and 612). However, group key 625 may not be used by any ECU in the group (e.g., ECU 620 or 622) to securely communicate with ECUs having lower security levels (e.g., ECUs 630 and 632 that may have the lowest security level).

ECUs 630, 632, and other ECUs that may have the lowest security level may be grouped together to share a single symmetric group key 635. ECUs 630 and 632 may include a light HSM to store group key 635. The light HSM may not need to support asymmetric key encryption and decryption (or authentication) and may not include an asymmetric cryptographic engine, a hash engine, or a secure CPU as shown in Table 1 above. Group key 635 may be used by any ECU in the group including ECU 630 to communicate with any other ECUs in the group. In some embodiments, group key 635 may also be provisioned to ECUs having higher security levels, and thus group key 635 may also be used by any ECU in the group (e.g., ECU 630 or 632) to securely communicate with ECUs having higher security levels (e.g., ECUs 610 and 612, and ECUs 620 and 622).

In some embodiments, the KDC in the ADC (e.g., key management module 422-a of FIG. 4) may maintain a security key configuration file that includes a list of ECUs registered with the ADC, the grouping of the ECUs, values of the security keys assigned to the ECUs, and the security key(s) provisioned to each ECU. An example of a security key configuration file is shown in Table 2 below. The example security key configuration file shown in Table 2 may include two or more ECU groups, including a Group 1 and a Group 2. Group 1 may include ECU 10, ECU 11, and ECU 12, all of which may have a medium security level. Group 2 may include ECU 20, ECU 21, and ECU 22, all of which may have the lowest security level. ECU 1 may be an ECU having a higher security level, and may communicate with ECU 2, ECU 4, and ECUs in Group 1 and Group 2. The security key assigned for communications between ECU 1 and ECU 2 may be K12, the security key assigned for communications between ECU 1 and ECU 4 may be K14, and the security key assigned for communications between ECU 2 and ECU 3 may be K23. The group key assigned to Group 1 may be GK1, and the group key assigned to Group 2 may be GK2. ECUs in Group 1 may communicate with each other using GK1 and may also communicate with ECU 1 using GK1. ECUs in Group 2 may communicate with each other with using GK2, and may also communicate with ECU 1 and ECUs in Group 1 using GK2.

TABLE 2

An example of a security key configuration file maintained by a KDC

[GROUP]
GROUP1=ECU10,ECU11,ECU12
GROUP2=ECU20,ECU21,ECU22
...
[KEY_VALUE]
K12=0x0123...def
K14=0x001122...ddeeff
K23=0x1122..ddee
GK1=0x7788...9900
GK2=0x8899...eeff
...
[ECU1]
ECU2=K12
ECU4=K14
GROUP1=GK1
GROUP2=GK2
...
[ECU10]
GROUP1=GK1
GROUP2=GK2
...
[ECU20]
GROUP2=GK2
...

In some embodiments, when the vehicle is powered up, the ADC (e.g., the KDC in the ADC) of the vehicle may scan and authenticate the ECUs in the vehicle based on the security key configuration file. For example, if an ECU listed in the security key configuration file cannot be detected or verified, the ECU may have been removed or changed. If an ECU not listed in the security key configuration file is detected, the ECU may be a new ECU that has been added to the vehicle. The ADC may report these changes to the security operation center on the cloud server.

In some embodiments, each ECU may have its own security key configuration file indicating how the ECU may use the keys provisioned to the ECU. For example, ECU 1 in the example shown in Table 2 may maintain a security key configuration file as shown in Table 3, which may include a portion of the information included in Table 2.

TABLE 3

An example of a security key configuration
file maintained by an ECU

```
[GROUP]
GROUP1=ECU10,ECU11,ECU12
GROUP2=ECU20,ECU21,ECU22
...
[KEY_VALUE]
K12=0x0123...def
K14=0x001122..ddeeff
GK1=0x7788...9900
GK2=0x8899...eeff
...
[ECU1]
ECU2=K12
ECU4=K14
GROUP1=GK1
GROUP2=GK2
```

Figure 7:
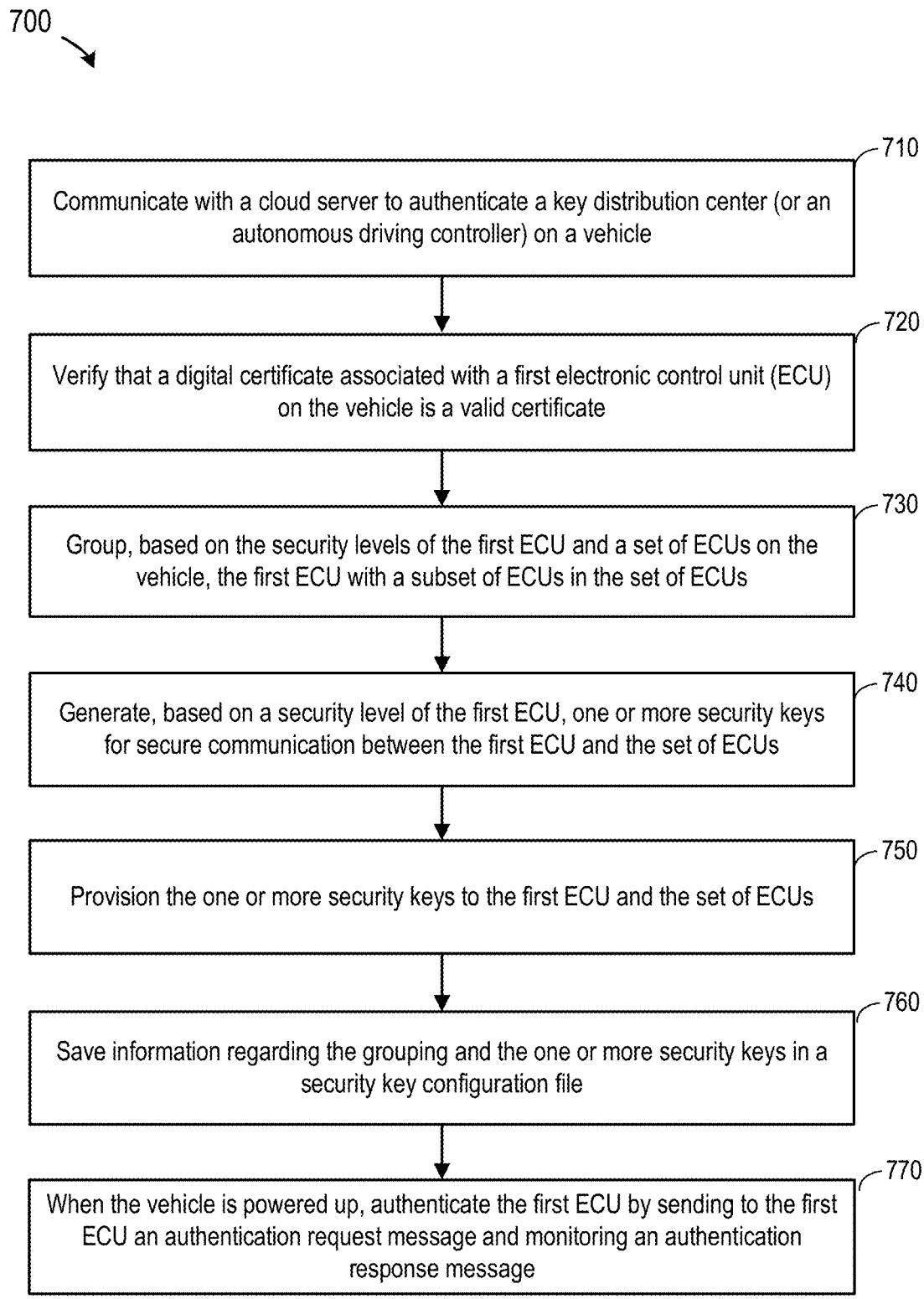
FIG. 7 is a simplified flow chart illustrating an example of a method for providing a trusted platform in a vehicle according to certain embodiments.

FIG. 7 is a simplified flow chart 700 illustrating an example of a method for providing a trusted platform in a vehicle according to certain embodiments. The processing depicted in FIG. 7 may be implemented in software (e.g., code, instructions, program) executed by one or more processing units (e.g., processors, cores) of the respective systems, hardware, or combinations thereof. The software may be stored on a non-transitory storage medium (e.g., on a memory device). The processing presented in FIG. 7 and described below is intended to be illustrative and non-limiting. Although FIG. 7 depicts the various processing steps occurring in a particular sequence or order, this is not intended to be limiting. In certain alternative embodiments, the steps may be performed in some different order or some steps may also be performed in parallel. In some embodiments, the processing described in FIG. 7 may be performed by a key distribution center (KDC), for example, in an autonomous driving controller (ADC) of an autonomous vehicle or on a cloud server, as described above.

Optionally, at block 710, the KDC may communicate with a cloud server to authenticate KDC (or the ADC) on a vehicle. As described above with respect to, for example, FIGS. 3 and 4, a cloud server (e.g., secure server 310 or cloud server 410) may authenticate the KDC or the ADC (e.g., master node 320 or ADC 420-a) through a wireless communication network using a device certificate and/or a private key, which may be obtained by the KDC from a provision center that may be different from the cloud server or that may be a part of the cloud server. In some embodiments, protocols such as transport layer security (TLS) may be used to authenticate the KDC or ADC.

At block 720, during key provisioning, the KDC may verify that a digital certificate associated with a first electronic control unit (ECU) on the vehicle is a valid certificate. The first ECU may be registered with the KDC if it can provide a valid PKI certificate issued by a certificate authority. The digital certificate may include the ECU's security level, which may be determined based on the hardware security module (HSM) level, such as full HSM, medium HSM, and light HSM described above. Some ECUs, such as ECUs controlling the engine, transmission, or brake, may have the highest security level.

Optionally, at block 730, the KDC may, based on the security levels of the first ECU and a set of ECUs on the vehicle that are registered with the KDC, group the first ECU with a subset of ECUs in the set of ECUs. For example, the first ECU and the subset of ECUs may have the same security level, such as a highest level, a medium level, or a lowest level. In some embodiments, the ECUs may be grouped based on some other criteria, such as the subsystems or domains they are in.

At block 740, the KDC may generate, based on a security level of the first ECU, one or more security keys for secure communication between the first ECU and the set of ECUs. For example, the KDC may determine that the first ECU has the highest security level, and thus may generate, for each respective ECU in the set of ECUs and having the highest security level, a unique security key for secure communication between the first ECU and the respective ECU, where the unique security key may only be used for secure communication between the first ECU and the respective ECU. In some embodiments, the KDC may determine that the first ECU has the highest security level, and generate an asymmetric security key pair that includes a public key and a private key for the first ECU. In some embodiments, the KDC may determine that the first ECU has the highest security level, and may select a subset of ECUs that has the highest security level from the set of ECUs, and determine a group key for secure communication between the first ECU and any ECU in the subset of ECUs and between any two ECUs in the subset of ECUs. In some embodiments, the KDC may determine that the first ECU has a medium security level, and may select a subset of ECUs that has the medium security level from the set of ECUs and determine a group key for secure communication between the first ECU and any ECU in the subset of ECUs and between any two ECUs in the subset of ECUs. In some embodiments, the group key may also be used for secure communication between the first ECU and a second ECU in the set of ECUs that has a security level higher than the medium security level. In some embodiments, the KDC may determine that the first ECU has a lowest security level, and determine a unique security key for secure communication between the first ECU and any ECU in the set of ECUs. In some embodiments, ECUs having different security levels may be grouped together and share a same group key. For example, some ECUs having a medium security level may be grouped with some ECUs having a higher security level, or may be grouped with some ECUs having a lower security level.

At block 750, the KDC may provision the one or more security keys to the first ECU and the set of ECUs as described above with respect to, for example, FIG. 4. The KDC may send the one or more keys to the first ECU and the set of ECUs that may communicate with the first ECU though the in-vehicle network, such as the CAN or FlexRay network. In some embodiments, the keys sent to the first ECU and/or the set of ECUs may be encrypted or authenticated, and the receiving ECU may decrypt or authenticate the key(s) and save the decrypted or authenticated key(s) in an HSM that may include a non-volatile memory. In some embodiments, each ECU may maintain a security key configuration file that indicates how the ECU may use the keys provisioned to the ECU. One example of the security key configuration file maintained by an ECU is shown in Table 3. As described above, when the first ECU communicates with a second ECU, the first ECU may generate a message authentication code based on a security key for communication between the first ECU and the second ECU, and send the message authentication code and a command to the second ECU. The second ECU may verify the message authentication code using the first security key, and then execute the command after verifying the message authentication code.

At block 760, the KDC may optionally save information regarding the grouping and the one or more security keys in a security key configuration file as shown in, for example, Table 2. As described above, the KDC may maintain a security key configuration file for all ECUs. When the KDC authenticates the first ECU and provisions keys to the first ECU, the KDC may add information regarding the first ECU and the one or more provisioned keys to the security key configuration file, and may also update the key information for the set of ECUs that may communicate with the first ECU.

At block 770, the KDC may authenticate the first ECU by sending to the first ECU an authentication request message and monitoring an authentication response message from the first ECU. For example, when the vehicle is powered up, the KDC may scan the ECUs in the vehicle based on the security key configuration file. If an ECU listed in the security key configuration file cannot be detected or verified, the ECU may have been removed or changed. If an ECU not listed in the security key configuration file is detected, the ECU may be a new ECU that has been added to the vehicle. The KDC may report these changes to the security operation center on the cloud server. If the first ECU listed in the security key configuration file is detected, the KDC may send to the first ECU an authentication request message that is encrypted or authenticated with a first security key in the one or more security keys, and determine if an authentication response message that is encrypted or authenticated with the first security key is sent by the first ECU to the KDC. If the first ECU has been changes, it may not have the right security keys to communication with the KDC or other ECUs. Thus, if an authentication response message is not sent by the first ECU to the KDC or if the authentication response message sent by the first ECU to the key distribution center is not encrypted or authenticated with the first security key, the KDC may report to, for example, a cloud server, that the first ECU has been changed. In some embodiments, the KDC may authenticate an ECU using asymmetric security keys. For example, the KDC may send to the first ECU an authentication request message that is encrypted or authenticated with a private key of the KDC, and determine if an authentication response message that is encrypted or authenticated with a private key of the first ECU is sent by the first ECU to the KDC.

In some circumstances, some ECUs may need to be replaced, repaired, or upgraded, or a new ECU may need to be added to the vehicle. However, when a repair person installs a new ECU on a vehicle, the new ECU may not have the right keys to verify itself, and thus may be detected and reported by the trusted platform. Because the new ECU may not have the right keys, it may not generate authenticated messages to communicate with other ECUs. Thus, the new or repaired ECUs, and thus the whole vehicle, may not function properly. The above-described trusted platform includes additional features to provide both security and convenience for installing a new ECU or repairing the vehicle when an ECU needs to be replaced, upgraded, or repaired.

According to certain embodiments, when one or more ECUs in the vehicle need to be replaced, repaired, upgraded, or added, a repair person (e.g., a technician or an owner of the vehicle) may first request authorization to temporarily disable the message authentication such that the vehicle may work in a repair (or maintenance) mode and the repair person can replace, repair, upgrade, or add the ECUs and test the functions of the ECUs, while keeping the vehicle working (without message authentication). The ADC or KDC in the trusted platform described above may authenticate the new (or repaired) ECUs by verifying the certificates of the new ECUs. If the new ECUs are qualified ECUs, the KDC may then, based on the security levels of the new ECUs specified in their respective certificates, provision new security keys used by the new ECUs for communicating with other ECUs in the vehicle. The new security keys are also provisioned to other ECUs communicating with the new ECUs, such that they can authenticate each other using the new security keys after the message authentication is enabled. For example, if a new qualified ECU is added to the vehicle, the keys to be provisioned to the new ECU and other ECUs that may communicate with the new ECU may be defined in a configuration file maintained by the KDC. The configuration file can be updated over-the-air, if needed. In addition, as described above, a configuration file for the new ECU may be saved on the new ECU to instruct the new ECU how to use the keys. If the new ECU is replacing an existing ECU on the vehicle, the new ECU may inherit the configuration file from the ECU being replaced, and some information (e.g. the key values) in the configuration file may be updated (e.g., based on the new provisioned key values). After re-provisioning and testing the new security keys, the repair person may re-enable the message authentication to enforce the message authentication so that any ECU without a valid security key can be detected and prevented from communicating with other ECUs in the normal operation mode as described above.

In order to prevent unauthorized change of ECUs in a vehicle, a repair person may need appropriate authorization or privilege to disable the message authentication and set the vehicle to the repair mode. The repair person may use an access control module to enable or disable the message authentication provided by the trusted platform. For example, as described in U.S. patent application Ser. No. 16/192,569, the repair person may request an authorization token from a security operation center on a cloud server. The repair person may then use the authorization token to disable the message authentication. If the requester of the authorization token is an authorized entity, such as the vehicle owner, vehicle operator, or contracted repair shop, the cloud server may issue the authorization token to allow the repair person to set the vehicle to the repair mode via a command, a menu, a soft button, or the like, such that the repair person can disable the message authentication for repairing and some testing. In some embodiments, the menu, button, or command may also be used to enable the message authentication.

As described above, the message authentication may be performed by verifying the message authentication checksum (MAC) in the encrypted message. In the repair mode, the software running on the ADC and ECUs may ignore the MAC verification result or bypass the MAC verification when exchanging messages. In this way, the ADC and ECUs may still communicate to test the functionality of the ECUs that have been changed or added. When the message authentication is disabled, the repair person can make changes to the ECUs in the vehicle. In some embodiments, during the repairing and testing, the message authentication may still be performed and the authentication results may still be reported, but the results (even if the authentication fails) may not prevent the ADC or an ECU from communicating with other ECUs.

After the changes to the ECUs are complete and the functionality of the new ECUs and the vehicle is tested, the new ECUs may be registered with the ADC (e.g., the KDC), and the KDC may assign and deliver new security key(s) to the new ECUs and other ECUs that may communicate with the new ECUs, and update the security key configuration file as shown in, for example, Table 2.

As described above, during ECU registration, the ADC and a new ECU may use PKI certificates to identify each other and establish a secure channel to communicate with each other. For example, the KDC may verify that the ECU's certificate is a valid certificate that the KDC can accept, such as a certificate issued by an approved certificate authority (e.g., an approved vendor or manufacturer of ECUs), and thus identify the ECU as a secure ECU. The KDC may also determine the security level of the ECU specified in the ECU's certificate. The ECU may also verify that the certificate of the KDC (or the ADC) is a valid certificate and is associated with a KDC (or ADC) that has the privilege to distribute security keys to ECUs. In some embodiments, the mutual authentication may be implemented using a transport layer security (TLS) secure session.

During the key provisioning and distribution, the KDC may set the security key(s) for the new ECU based on the security level identified in the certificate and send the security key(s) to the ECU via secure communication. For example, the ECU may first verify that the key(s) are set by the KDC. After that, the security keys can be provisioned to the new ECUs and other ECUs that may communicate with the new ECUs. As described above, the KDC may manage the security keys using a security key configuration file, which may specify all security keys for each ECU or ECU group, the key types, the security levels, and the like. One example of the security key configuration file is shown in Table 2 described above. If the ECU that includes the KDC (e.g., the ADC) is replaced, the new ADC may be verified by the security operation center on the cloud server and all security keys for the ECUs in the vehicle may be re-provisioned as described above with respect to, for example, FIGS. 3 and 4.

Figure 8:
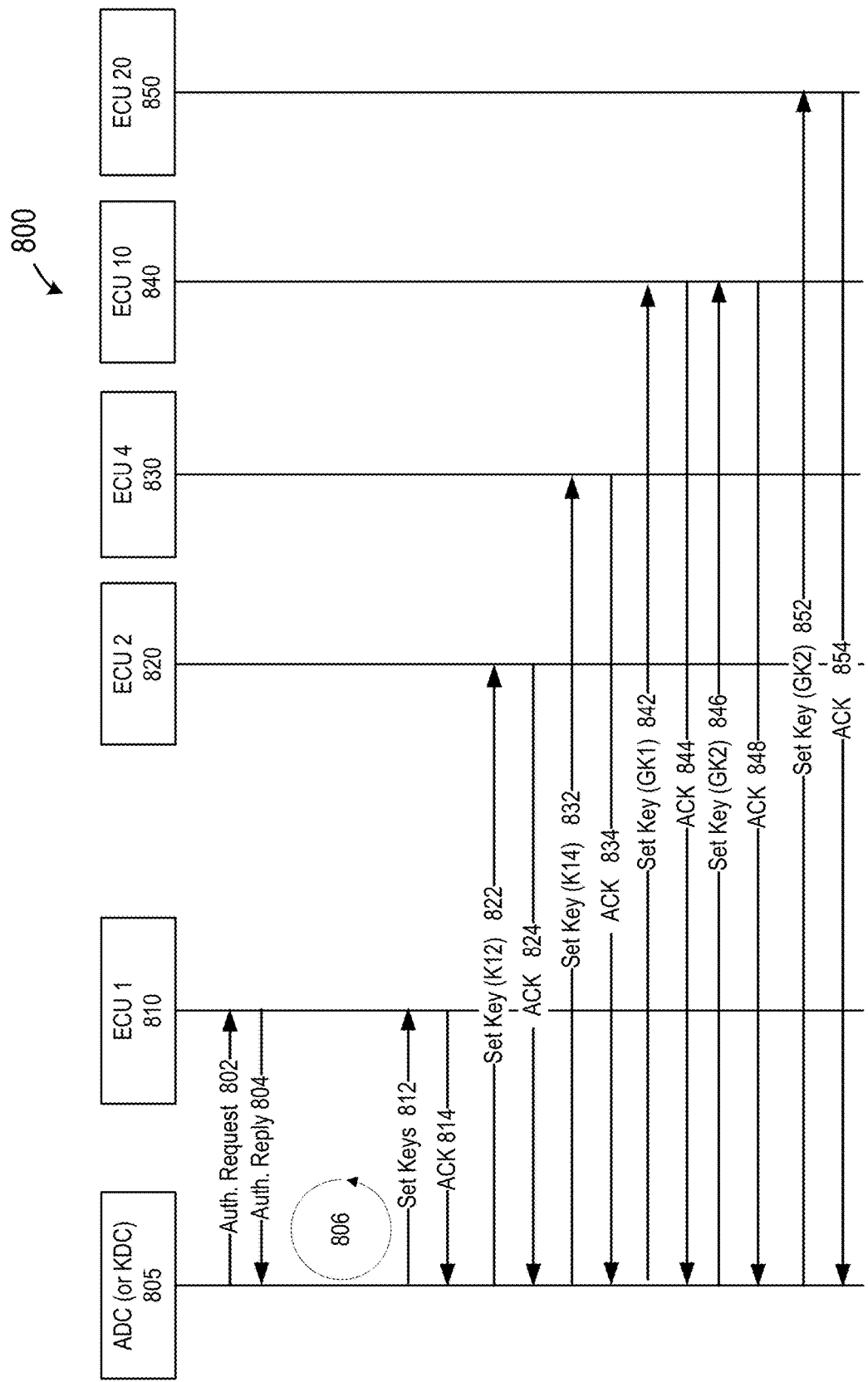
FIG. 8 is a simplified flow diagram illustrating an example of re-provisioning security keys after changing an ECU according to certain embodiments.

FIG. 8 is a simplified flow diagram 800 illustrating an example of re-provisioning security keys after changing an ECU (e.g., repairing or replacing ECU 1 (810)) according to certain embodiments. As illustrated, multiple ECUs may communicate with ECU 1 (810), including, for example, an ADC 805 (or a KDC in ADC 805), ECU 2 (820), ECU 4 (830), ECU 10 (840), ECU 20 (850), and the like. In the example shown in FIG. 8, the security key configuration file stored in the KDC may be shown in Table 2 described above. When ECU 1 (810) is replaced, ADC 805 (more specifically, the KDC in ADC 805) may run a provisioning program to re-provision the security keys associated with ECU 1 (810).

ADC 805 may first check all installed ECUs to see which one is changed. For example, ADC 805 may send an authentication request message to each ECU, and the ECU may respond with an authentication response message. If the authentication response message can be authenticated by ADC 805, the corresponding ECU has not been changed (e.g., replaced, repaired, or otherwise modified). If ADC 805 could not receive an authentication response message that can be authenticated by ADC 805, the corresponding ECU may have been changed or added.

In the example shown in FIG. 8, after detecting that ECU 1 (810) has been changed, ADC 805 may check the security key configuration file as shown in Table 2 to find out how many security keys are associated with ECU 1 (810). In some embodiments, all security keys associated with ECU 1 (810) may be re-generated in order to avoid using the security keys stored on the ECU being replaced, which may be compromised or may be easier to compromise if the replaced ECU is acquired by an attacker. In the example shown in FIG. 8 and Table 2, ECU 1 uses security keys K12, K14, GK1, and GK2 to communicate with ECU 2 (820), ECU 4 (830), ECUs in Group 1, and ECUs in Group 2, respectively. Thus, security key K12, K14, GK1, and GK2 may be re-generated, for example, randomly, and may be provisioned to the new ECU 1 (810).

The security keys used by other ECUs to communicate with the ECU that has been changed to new ECU 1 (810) may also be provisioned at these ECUs. For example, ADC 805 may not only provision the re-generated security keys K12, K14, GK1, and GK2 to ECU 1 (810), but also provision the re-generated security key K12 to ECU 2 (820), and provision the re-generated security key K14 to ECU 4 (830). In addition, ADC 805 may provision the re-generated security keys GK1 and GK2 to ECU 10 (840) because ECU 10 (840) has a medium security level, may use security key GK1 to communicate with ECUs having the medium security level (e.g., having a medium HSM), and may use security key GK2 to communicate with ECUs having the lowest security level (e.g., having a light HSM). ADC 805 may further provision the re-generated security key GK2 to ECU 20 (850) because ECU 20 (850) has the lowest security level and includes a light HSM to hold security key GK2 for all communications with other ECUs having the lowest security level and higher security levels.

As shown in FIG. 8, ADC 805 may first send an authentication request message 802 to ECU 1 (810), and ECU 1 (810) may respond with an authentication response message 804. ADC 805 may not be able to authenticate ECU 1 (810) because authentication response message 804 may not have been encrypted or authenticated with a valid security key, and thus ADC 805 may determine that ECU 1 (810) may have been changed. Thus, at 806, ADC 805 may re-generate security keys for ECU 1 (810) based on the security key configuration file. For example, ADC 805 may re-generate security keys K12, K14, GK1, and GK2 at 806, and provision the keys to ECU 1 (810) at 812. ECU 1 (810), upon receiving the re-generated security keys, may send an acknowledge message 814 to ADC 805. In some embodiments, acknowledge message 814 may include authentication messages each generated with a respective security key in the re-generated security keys, in order for the KDC to verify that ECU 1 (810) has correctly received all the security keys.

As also shown in FIG. 8, at 822, ADC 805 may provision security key K12 to ECU 2 (820), which may send an acknowledge message 824 to ADC 805. Acknowledge message 824 may include a message authentication code (MAC) generated using security key K12. At 832, ADC 805 may provision security key K14 to ECU 4 (830), which may send an acknowledge message 834 to ADC 805. Acknowledge message 834 may include a MAC generated using security key K14. At 842, ADC 805 may provision security key GK1 to ECU 10 (840), which may send an acknowledge message 844 to ADC 805. Acknowledge message 844 may include a MAC generated using security key GK1. At 846, ADC 805 may provision security key GK2 to ECU 10 (840), which may send an acknowledge message 848 to ADC 805. Acknowledge message 848 may include a MAC generated using security key GK2. At 852, ADC 805 may provision security key GK2 to ECU 20 (850), which may send an acknowledge message 854 to ADC 805. Acknowledge message 854 may include a MAC generated using security key GK2.

After the security keys are re-generated and provisioned, the repair person may set the vehicle back to the normal operation mode. In some embodiments, after the security keys are re-generated and provisioned and before setting the vehicle to normal operation mode, the repair person may enable the message authentication to test and verify that the security keys are set correctly by sending and receiving messages using the ECUs that have the re-generated security keys. During this test, the authenticated messages may be verified but the results may not be enforced, such that, even if a message authentication fails, the corresponding message is not blocked, and the results may be reported. After verifying that the security keys are set correctly and the message authentication works properly, the repair person may change the vehicle from the repair mode to normal operation mode, in which the message authentication is enforced.

Figure 9:
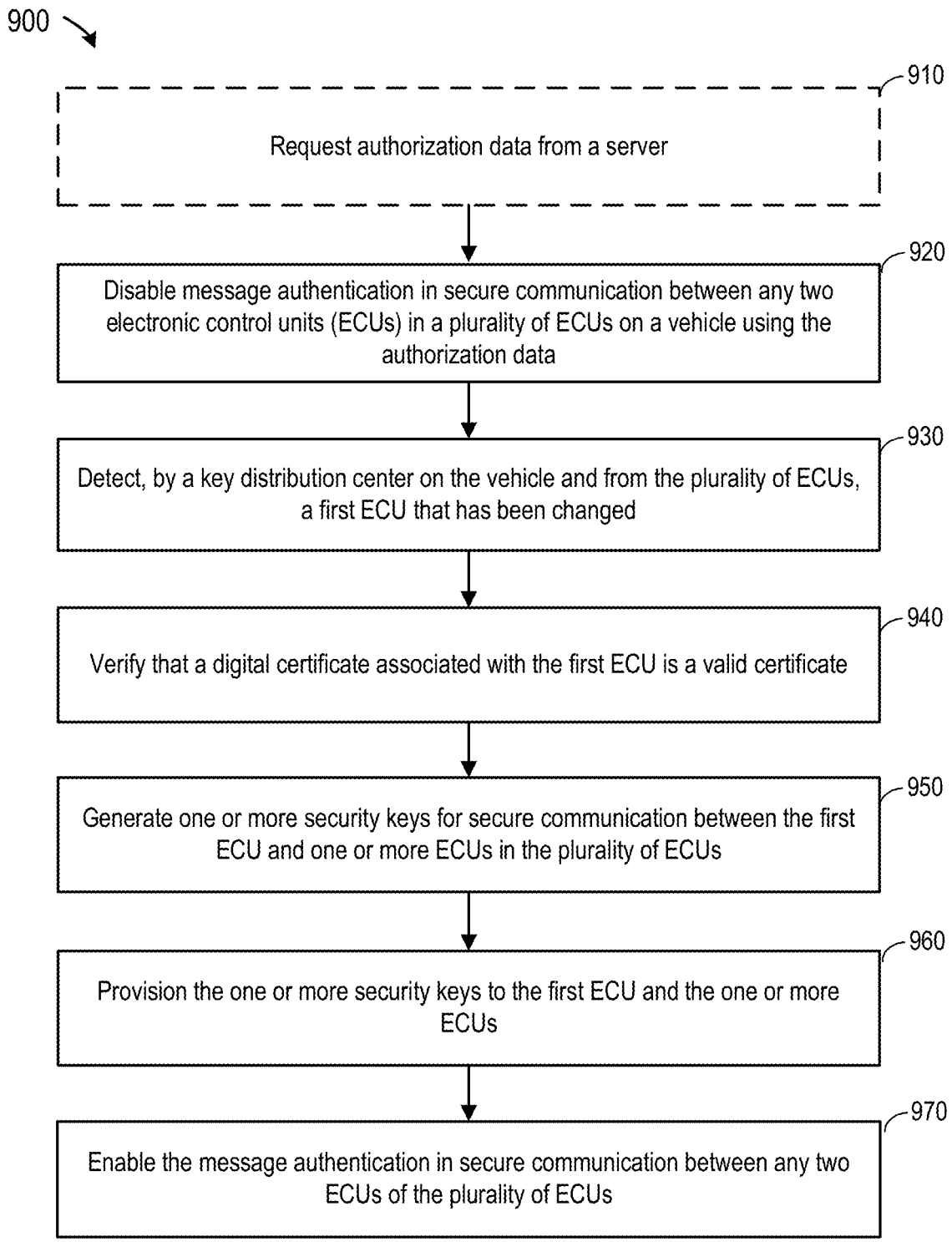
FIG. 9 is a simplified flow chart illustrating an example of a method for changing an ECU in a trusted platform environment in a vehicle according to certain embodiments.

FIG. 9 is a simplified flow chart 900 illustrating an example of a method for changing an ECU in a trusted platform environment in a vehicle according to certain embodiments. The processing depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The processing presented in FIG. 9 and described below is intended to be illustrative and non-limiting. Although FIG. 9 depicts the various processing steps occurring in a particular sequence or order, this is not intended to be limiting. In certain alternative embodiments, the steps may be performed in some different order or some steps may also be performed in parallel. In some embodiments, the processing described in FIG. 9 may be performed by, for example, a key distribution center (KDC), for example, in an autonomous driving controller (ADC) of an autonomous vehicle or on a cloud server, as described above, or by a repair person using the KDC.

Optionally, at block 910, a repair person who needs to replace, repair, upgrade, or add one or more ECUs in the vehicle may request authorization data from a security operation center. As described above, in order to prevent unauthorized change of ECUs in a vehicle, a repair person may need appropriate authorization or privilege to disable message authentication and set the vehicle to a repair mode. The repair person may use an access control module to enable or disable the message authentication provided by the trusted platform. For example, as described in U.S. patent application Ser. No. 16/192,569, the repair person may request an authorization token from a security operation center on a cloud server.

At block 920, the repair person may use the KDC to disable the message authentication in secure communication between any two electronic control units (ECUs) in a plurality of ECUs on the vehicle using the authorization data, such as the authorization token. As described above, the message authentication may be disabled and/or enabled via a command, a menu, a soft button, or the like. As also described above, the secure communication between any two ECUs may be performed by encrypting or authenticating the exchanged messages using a security key. Disabling the message authentication in secure communication between any two ECUs may include executing, by the receiving ECU, a command sent in a message regardless of the result of verifying the message (more specifically, a message authentication code in the message), or bypassing the verification of the message authentication code.

At block 930, the KDC may detect, from the plurality of ECUs, a first ECU that has been changed. The first ECU may be a new ECU replacing an old ECU or an additional new ECU. As described above, the KDC may scan the ECUs in the vehicle, for example, based on a security key configuration file, and verify the detected ECUs using authentication request messages. In some embodiments, detecting the first ECU that has been changed may include sending, by the KDC to the first ECU, an authentication request message that is encrypted or authenticated with a valid security key, and determining by the KDC that the first ECU has been changed based on determining that an authentication response message is not sent by the first ECU to the KDC or the authentication response message sent by the first ECU to the KDC is not encrypted or authenticated with the valid security key.

At block 940, the KDC may verify that a digital certificate associated with the first ECU is a valid certificate that the KDC can accept, such as a certificate issued by an approved certificate authority (e.g., an approved vendor or manufacturer of ECUs), and thus identify the first ECU as a secure ECU. The KDC may also determine the security level of the first ECU specified in the first ECU's digital certificate, and group the first ECU with other ECUs.

At block 950, the KDC may generate one or more security keys for secure communication between the first ECU and one or more ECUs in the plurality of ECUs. As described in detail above, the KDC may generate the one or more security keys based on the security level of the first ECU, where some security keys in the one or more security keys may be unique security keys between two ECUs, while some other security keys in the one or more security keys may be group keys for ECUs having the same security level or different security levels. As also described above, the KDC may generate the one or more security keys based on the security key configuration file. For example, if the first ECU is a replacement ECU, the KDC may generate the one or more security keys based on the number of unique security keys associated with the first ECU in the security key configuration file. If the first ECU is an additional ECU, the KDC may determine what security keys to provision based on the security level and the grouping of the first ECU with other ECUs, or based on an updated security key configuration file.

At block 960, the KDC may provision the one or more security keys to the first ECU and the one or more ECUs as described above, for example, with respect to block 750. In some embodiments, the KDC may update the security key configuration file based on the provisioning, such as updating values of the one or more security keys if the first ECU is a replacement ECU, or adding new entries in the security key configuration file if the first ECU is an additional ECU. In some embodiments, a configuration file in the first ECU may also be updated or added.

At block 970, the KDC may enable the message authentication in secure communication between any two ECUs of the plurality of ECUs, for example, via the command, a menu, a soft button. In some embodiments, before re-enable the message authentication in secure communication, the functionality of the first ECU and the secure communication between the first ECU and other ECUs or the ADC may be tested. For example, the messages may be encrypted or authenticated using the keys, and the authentication results may be reported, but may not block the ECUs from communicating or executing commands from other ECUs.

Figure 10:
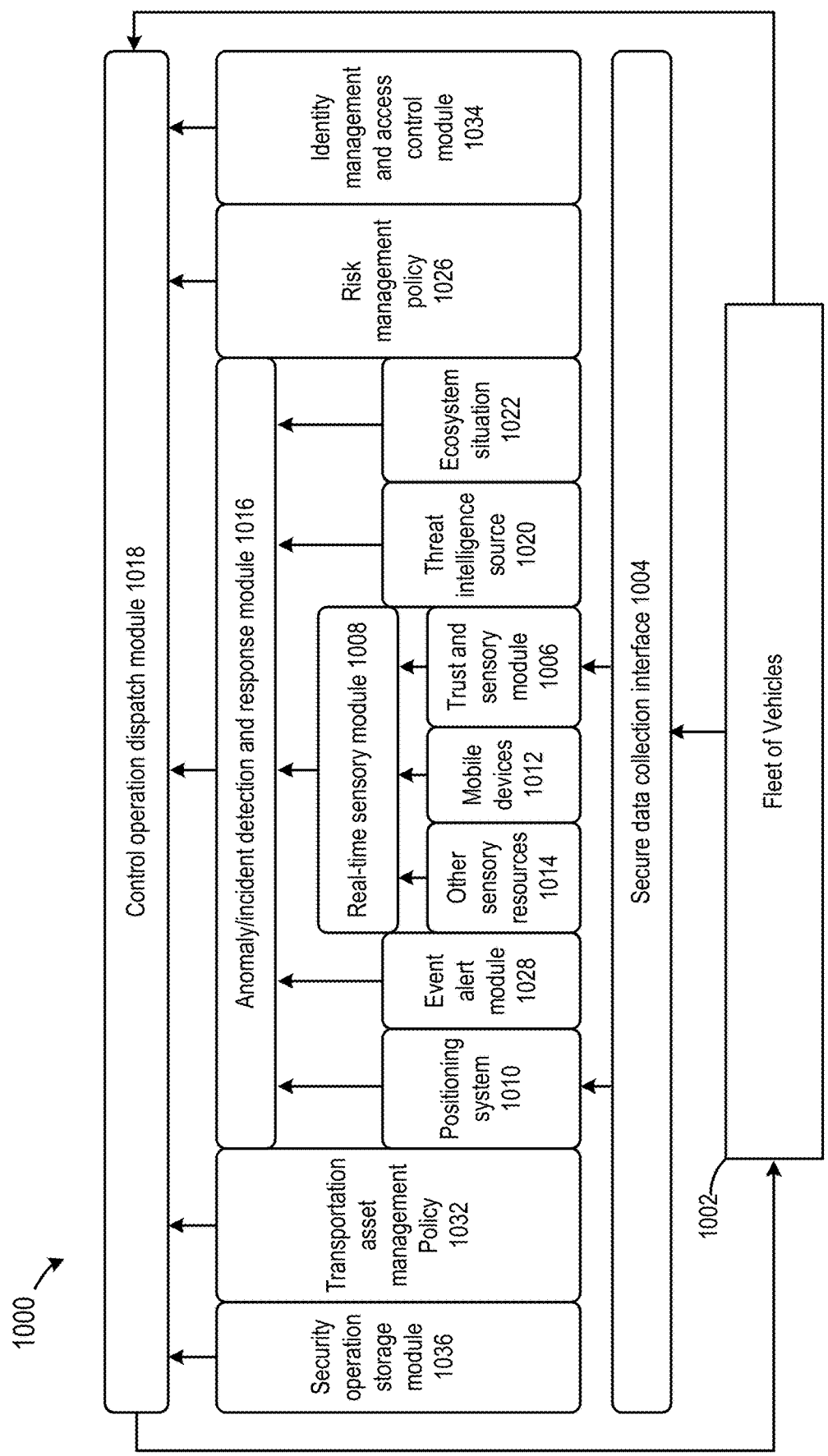
FIG. 10 illustrates an example of a security and safety platform for operating autonomous vehicles according to certain embodiments.

FIG. 10 illustrates an example of a security and safety platform 1000 for operating autonomous vehicles according to certain embodiments. Security and safety platform 1000 may be a specific implementation of at least some operations of autonomous vehicle trusted platform 100. Security and safety platform 1000 can manage the security and safety of a fleet of vehicles, including fleet of vehicles 1002. Security and safety platform 1000 can collect various operation data of fleet of vehicles 1002, as well as environment data from other sources related to an environment in which the fleet of vehicles operate. Security and safety platform 1000 can process the data to detect and respond to incidents/anomalies, and determine a corresponding risk scenario. Security and safety platform 1000 can then determine one or more control operations based on the risk scenario. Security and safety platform 1000 can also take into account other information such as management policies, pre-configured security operations, access control rules, etc., to formulate the control operations. Security and safety platform 1000 can then dispatch instructions to fleet of vehicles 1002 to perform the control operations to mitigate the risk. Fleet of vehicles 1002 can include various types of vehicles operating in different operation environments and providing different services. For example, fleet of vehicles 1002 can include vehicles that provide private transportation, public transportation, ride-sharing, etc. Fleet of vehicles 1002 can include autonomous driving (AD) vehicles, manually-driven vehicles, etc.

Security and safety platform 1000 can further include a secure data collection interface 1004 to collect various operation data from fleet of vehicles 1002. The operation data may include, for example, location data, speed data, sensor data (e.g., sensor data from a cabin door sensor, a hood sensor, tire pressure sensors, etc.), status data from various electronic components of the vehicles, etc. To protect privacy and to avoid the operation data from being intercepted, secure data collection interface 1004 can establish a secure wireless channel with each vehicle of the fleet, and receive, in real-time, the operation data from the vehicles via the secure wireless channels. Security and safety platform 1000 further includes a trust and sensory module 1006 which can provide the credential information (e.g., public key certificate, etc.) to perform mutual authentication with fleet of vehicles 1002 to authenticate security and safety platform 1000 and to establish the secure wireless channels with secure data collection interface 1004. Trust and sensory module 1006 can also perform certain post-processing operations on the real-time operation data, such as identifying the vehicles and the sensors that provide the sensor data, extracting the time information, etc., from the real-time operation data, and provide the post-processed real-time operation data to a real-time sensory module 1008. The location and speed data from secure data collection interface 1004 can also be processed by positioning system 1010 to generate and/or update position information of each vehicle of fleet of vehicles 1002. As to be described below, the position information of the vehicles can be correlated with other aspects of the real-time operation data provided by the vehicle to detect safety and/or security risks.

In addition to the real-time operation data from fleet of vehicles 1002 (provided by trust and sensory module 1006), real-time sensory module 1008 can also obtain real-time environment data related to the environment(s) in which the fleet of vehicles operates in. As shown in FIG. 10, the real-time environment data can be obtained from mobile devices 1012 and other sensory resources 1014, among others. The real-time environment data may include, for example, reports provided by mobile devices 1012, which can be operated by the passengers of fleet of vehicles 1002, other road users, pedestrians, repair service personnel, etc. The reports may include, for example, traffic condition reports, road condition reports (e.g., whether a road is closed or otherwise not suitable for driving), etc. Mobile devices 1012 can also transmit access requests to access certain features and resources of fleet of vehicles 1002 by the passengers, the repair service personnel, etc. In addition, other sensory resources 1014 may include fixed and/or mobile sensors installed as part of a city infrastructure to provide environment sensory data including, for example, weather conditions, traffic conditions, etc. Real-time sensory module 1008 can provide the real-time environment data (e.g., reports from mobile devices 1012, environment sensory data from other sensory resources 1014, etc.) as well as the real-time operation data (from trust and sensory module 1006) to anomaly/incident detection and response module 1016, which may also be configured to receive position information of fleet of vehicles 1002 from positioning system 1010. In some embodiments, real-time sensory module 1008 can be configured to receive real time data, the real-time environment data, and the real-time operation data (including the position information) to detect safety and/or security risks.

In addition to real-time environment data and real-time operation data, anomaly/incident detection and response module 1016 can receive additional information/data from other sources to perform safety and/or security risks detection, and to provide a response. For example, anomaly/incident detection and response module 1016 can receive alerts/reports about certain public events (which can be pre-planned, or based on real-time reporting, such as hazardous weather conditions, traffic accidents, etc.) at different locations and times from event alert module 1028, and provide a response. Anomaly/incident detection and response module 1016 can also monitor network activities and detect potential cyber security attacks. Anomaly/incident detection and response module 1016 can also receive, from threat intelligence source 1020, warnings of potential security threats, such as potential criminal, terrorist, or other hostile actions, at different locations and times. In addition, ecosystem situation 1022 may also provide, for example, environment and operation data from other fleets of vehicles operated by other vendors. All these data can be integrated by anomaly/incident detection and response module 1016 to perform safety and/or security risks detection.

Anomaly/incident detection and response module 1016 can include logic to analyze the real-time environment data and real-time operation data (from real-time sensory module 1008), position information of fleet of vehicles 1002 (from positioning system 1010), public events alerts/reports (from event alert module 1028), warnings of potential security threats (from threat intelligence source 1020), and ecosystem data (from ecosystem situation 1022), and identify potential safety and/or security risks. The analysis can be based on, for example, correlating operation data with time and location information of fleet of vehicles 1002, detecting patterns of operations, etc., while taking into consideration warnings and alerts about known events and threats. Anomaly/incident detection and response module 1016 can also generate a risk assessment including, for example, an identification of the safety and/or security risk, time and location of the risk, severity of the risk, etc., and send the result of the analysis to control operation dispatch module 1018.

As an illustrative example, real-time sensory module 1008 may receive sensor data from a vehicle of fleet of vehicles 1002. The sensor data may be generated by a sensor at a vehicle compartment which houses the electronic control unit (ECU) of the vehicle. Anomaly/incident detection and response module 1016 may receive the sensor data from real-time sensory module 1008, and determine that there is a current (or at a certain pre-determined time) attempt to access the vehicle compartment. Anomaly/incident detection and response module 1016 may determine whether such an event indicates a potential security or safety risk. To make the determination, anomaly/incident detection and response module 1016 may obtain additional data from other sources, such as positioning system 1010, threat intelligence source 1020, etc., as well as login data and access request provided by users who try to access vehicles 1002, and correlate the additional data with the event. For example, anomaly/incident detection and response module 1016 may determine, based on position information of the vehicle from positioning system 1010, whether the vehicle is at a location where the compartment door is not expected to be opened. If the position information indicates that vehicle is at a repair shop, at the vehicle owner's premise, etc., at the time when the attempt to access the compartment door is detected, and a temporary access request to a vehicle compartment is received, anomaly/incident detection and response module 1016 may determine that the attempted access does not pose a security risk and may grant access to the vehicle compartment. As another example, if the information provided by threat intelligence source 1020, together with the position information from positioning system 1010, indicate that the vehicle is located in an area where car theft is rampant, and an access attempt from a user who has no access right to the vehicle compartment is detected, anomaly/incident detection and response module 1016 may determine that the attempted access poses a heightened security risk and can provide an appropriate response (e.g., by disabling the access to the vehicle compartment, by issuing an alert to law enforcement, etc.).

Control operation dispatch module 1018 can receive the risk assessment (e.g., the identified risk, a severity of the risk, etc.) for a vehicle from anomaly/incident detection and response module 1016, and determine an action to be performed at the vehicle to mitigate a safety/security risk based on the risk assessment. The determination can be based on applying a set of rules to the identified risk and the severity of the risk, and the rules can come from various sources. For example, as shown in FIG. 10, control operation dispatch module 1018 can receive rules defined in risk management policy storage 1026 and transportation asset management policy storage 1032, and apply the rules to determine the action. Referring back to the vehicle compartment access example above, transportation asset management policy storage 1032 may provide rules that specify that the compartment of a vehicle stores critical electronic components, and authorization is needed before granting access to the compartment. Risk management policy storage 1026 can define a set of operations to determine whether to authorize access to the compartment (e.g., requesting credential information from the requester). For example, in a case where the requester for the vehicle compartment access is a registered user (e.g., a driver, a passenger, etc.) of fleet of vehicles 1002, control operation dispatch module 1018 can operate with an identity management and access control module 1034 to authenticate the identity of the requester, and to determine the access right of the requester with respect to the vehicle compartment. In cases where anomaly/incident detection and response module 1016 determines that the severity of a risk is high, control operation dispatch module 1018 can perform security operations based on definitions stored in an security operation storage 1036 to mitigate the security risk. For example, threat intelligence source 1020 may indicate that there is high likelihood that the entire fleet of vehicles 1002 may be under cyberattack. Security operations storage 1036 may define that control operation dispatch module 1018 should disable passengers' access to the Internet for each vehicle of the fleet (while maintaining the network connection between the vehicles and security and safety platform 1000) when the risk of cyberattack is high. Control operation dispatch module 1018 can then configure (or send instructions to) fleet of vehicles 1002 to disable Internet access by the passengers.

Figure 11:
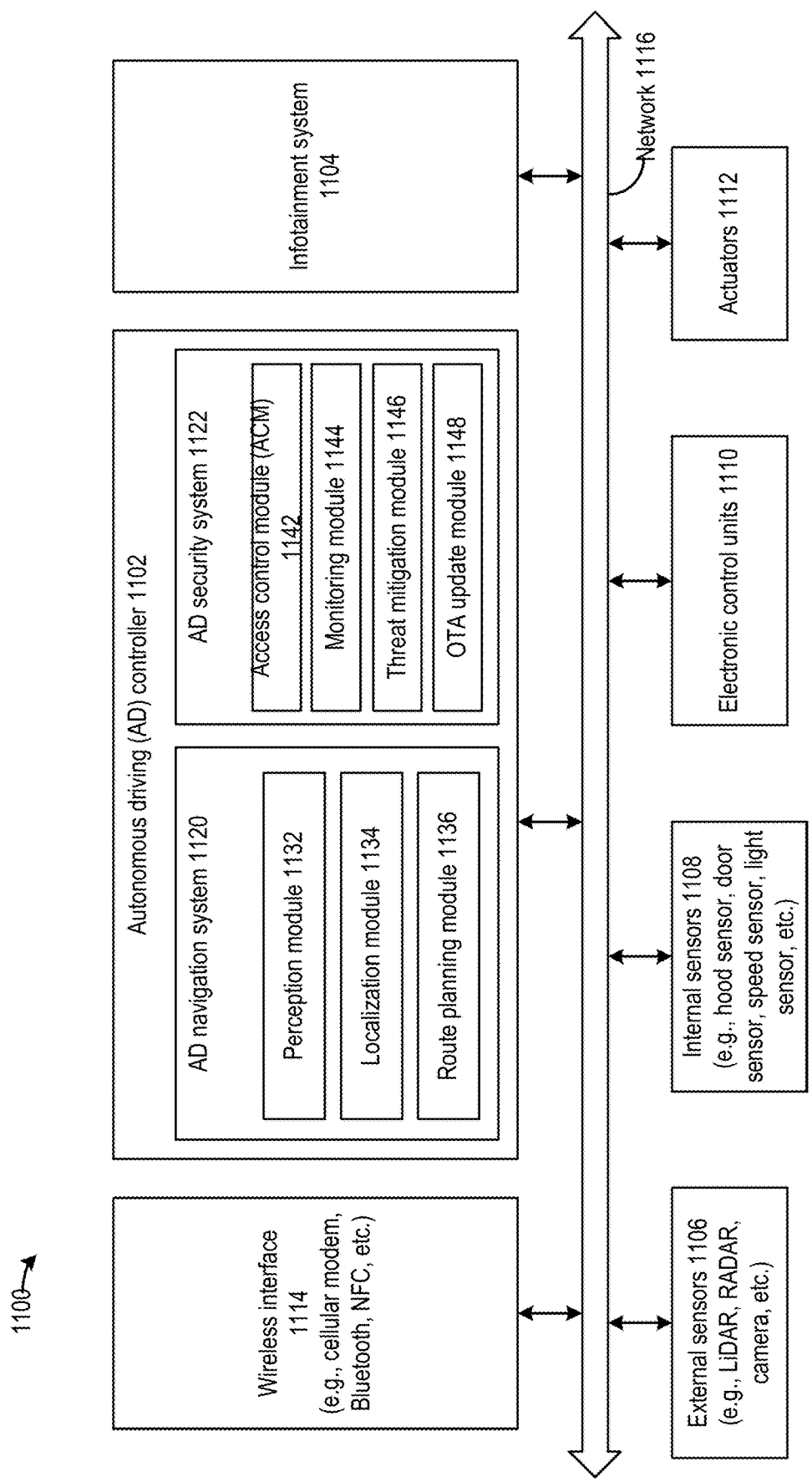
FIG. 11 is a simplified block diagram illustrating an example of a vehicle electronic system for implementing some techniques disclosed herein according to certain embodiments.

FIG. 11 is a simplified block diagram illustrating an example of a vehicle electronic system 1100 for implementing some techniques disclosed herein according to certain embodiments. Vehicle electronic system 1100 can be part of security and safety platform 1000 of FIG. 10. Vehicle electronic system 1100 can also be part of an autonomous driving (AD) vehicle and can include various electronic components including, for example, an AD controller 1102, an infotainment system 1104, external sensors 1106, internal sensors 1108, a plurality of electronic control units (ECUs) 1110, a plurality of actuators 1112, and a wireless interface 1114. The electronic components are coupled to network 1116. Via network 1116, the electronic components can communicate with each other. In some examples, network 1116 can include a CAN bus. In some examples, some of the components can also be connected directly, rather than via network 1116. For example, external sensors 1106, internal sensors 1108, and actuators 1112 may be directly connected to AD controller 1102, such that AD controller 1102 can detect and control unauthorized access to the vehicle even when network 1116 is not working.

AD controller 1102 can include components to support various operations related to autonomous driving including, for example, navigation and control, security and protection, etc. In some embodiments, the modules and subsystems of AD controller 1102 can be implemented in the form of software instructions executable on a general purpose computer. In some embodiments, the modules and subsystems of AD controller 1102 can be implemented on an integrated circuit (IC) such as Application Specific Integrated Circuit (ASIC), field-programmable gate array (FPGA), System-on-Chip (SoC), etc. In some embodiments, AD controller 1102 can include AD navigation subsystem 1120 and AD security subsystem 1122. AD navigation subsystem 1120 can obtain sensor data from external sensors 1106 which may include, for example, LiDAR data, RADAR data, camera image data, etc., perform navigation operations based on the sensor data, and control the speed and the steering of the vehicle to bring the vehicle to a destination. As shown in FIG. 11, AD navigation subsystem 1120 can include a perception module 1132, a localization module 1134, and a planning module 1136. Perception module 1132 can analyze the sensor data from external sensors 1106 to generate perception data about an environment the vehicle is operating in to determine a location of the vehicle. For example, perception module 1132 can analyze the LiDAR and RADAR data to determine, for example, a distance between obstacles (e.g., landmarks, buildings, etc.) and the vehicle. Perception module 1132 can also analyze the image data from the cameras to extract, for example, images of landmarks, buildings, etc. Localization module 1134 can obtain the perception data from perception module 1132 and determine, for example, a direction of travel of the vehicle, a location of the vehicle, etc. For example, localization module 1134 can store a set of locations of landmarks within a locale. Localization module 1134 can determine a current position of the vehicle within the locale based on a landmark identified from the image data, as well as distance from the identified landmark based on the LiDAR and/or RADAR data. Planning module 1136 can determine one or more control decisions of the vehicle (e.g., a direction of travel of the vehicle, a speed of the vehicle, etc.) based on the current position of the vehicle and a destination of the vehicle. Planning module 1136 can transmit control signals via network 1116 to electronic control units 1110 to control the steer angle of the vehicle, the throttle of the engine of the vehicle (to control its speed), etc., based on the control decisions. Planning module 1136 can also transmit the control decisions to infotainment system 1104 for output. For example, infotainment system 1104 may provide navigation output (e.g., audio and/or video feedback) to the passengers to let them know the location of the vehicle and which direction the vehicle is heading.

In addition, AD security subsystem 1122 can provide security and protection to the vehicle by regulating access to various features and functions of the vehicle and by performing operations to minimize security and safety threats. As shown in FIG. 11, AD security subsystem 1122 can include an access control module (ACM) 1142, a monitor module 1144, a threat mitigation module 1146, and an over-the-air (OTA) update module 1148. ACM 1142 can control access to various software and hardware components of the vehicle. For example, ACM 1142 can regulate access to the passenger cabin, the vehicle compartments, etc., to regulate physical access to the vehicle. ACM 1142 can also regulate access to software features and functions provided by other electronic components of the vehicle including, for example, infotainment system 1104. For example, infotainment system 1104 may provide access to certain content (e.g., entertainment, news, navigation information, etc.), and the access to the content can be restricted to certain privileged users/passengers. The access restriction can be enforced by ACM 1142. As to be described in more details below, ACM 1142 can communicate with a requester of the access and/or with a remote trusted platform (e.g., a management server) to authenticate the requester and to determine the access right of the requester.

In addition, monitoring module 1144 can monitor the operation condition of the vehicle based on, for example, obtaining sensor data from external sensors 1106 (e.g., LiDAR, RADAR, camera, etc.), sensor data from internal sensors 1108 (e.g., hood sensor, door sensor, speed sensor, light sensor, etc.), user inputs to electronic components of the vehicle (e.g., infotainment system 1104, ACM 1142), etc. Threat mitigation module 1146 can detect security and/or safety risks from the operation condition, and perform one or more operations to mitigate the security and/or safety risks. For example, threat mitigation module 1146 can determine, based on the speed sensor data and LiDAR data, that there is a high risk that the vehicle will collide with an obstacle in its current trajectory, and can control ECUs 1110 to automatically apply the brakes on the vehicle. As another example, threat mitigation module 1146 can determine that an attempt to open the cabin door is detected based on ACM 1142 and the passenger cabin door sensor data, and that the person seeking to open the cabin door is not authorized to access the cabin. In such situations, threat mitigation module 1146 can control actuators 1112 to, for example, lock the cabin door. OTA update module 1148 can receive update information from a remote server (e.g., a management service server) to update, for example, rules and patterns for security/safety threat detection.

In addition, vehicle electronic system 1100 can include wireless interface 1114 to perform long-range and short-range communication to support safety and/or security management operations. For example, wireless interface 1114 may include a long-range communication interface, such as a cellular modem, to transmit operation data (e.g., collected by monitoring module 1144) to a remote management server, and to receive instructions from the remote management server to enable or disable accesses to various components of the vehicle. As another example, wireless interface 1114 may include a short-range communication interface, such as Bluetooth, Near Field Communication (NFC), etc., to receive an access request from a mobile device for accessing the software and/or hardware components of the vehicle (e.g., vehicle compartment, infotainment system 1104, etc.), and forward to access request as well as credential information to ACM 1142.

Figure 12:
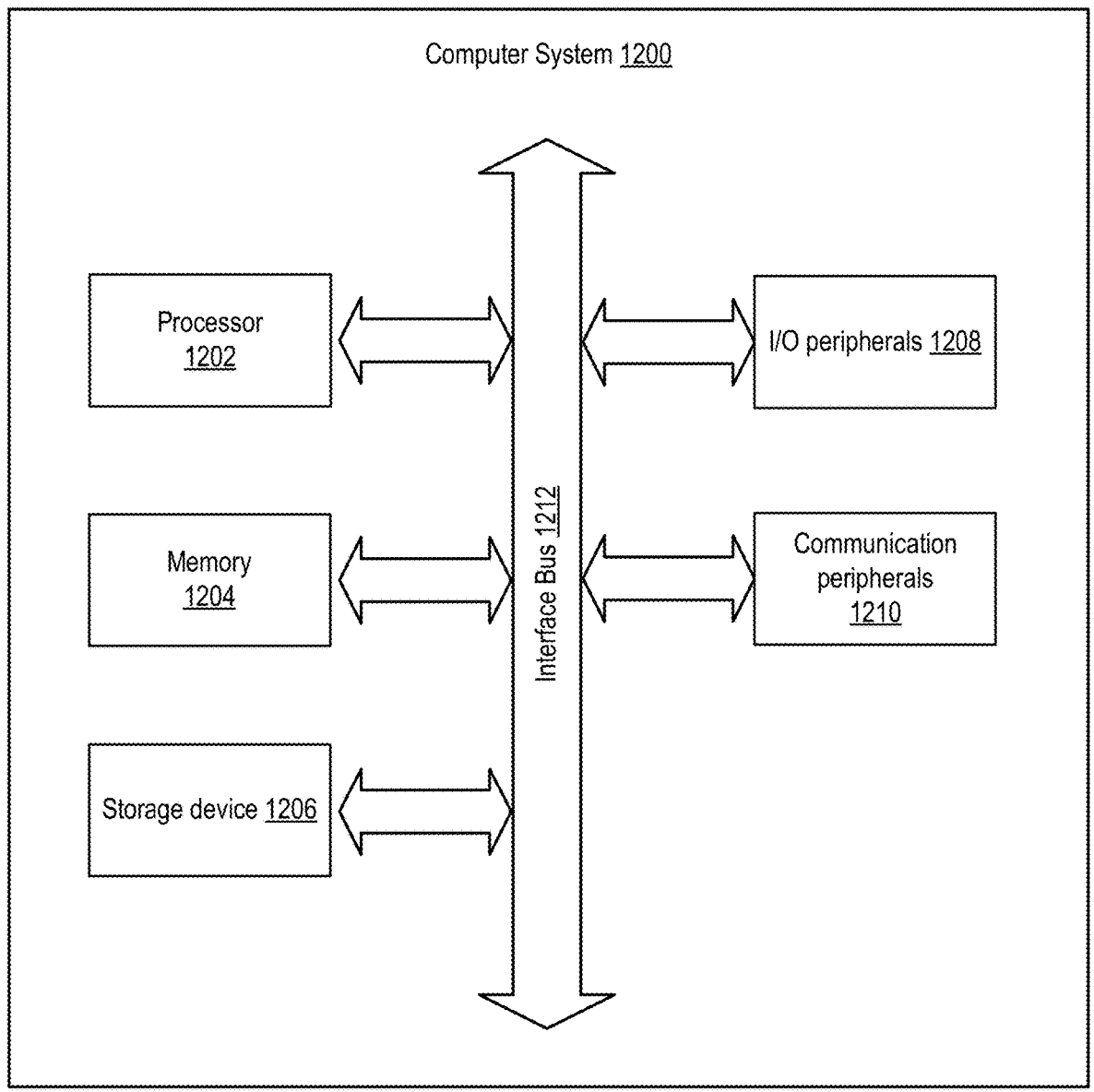
FIG. 12 is a simplified block diagram of an example of a computer system for implementing some techniques disclosed herein according to certain embodiments.

FIG. 12 illustrates an example computer system 1200 for implementing some of the embodiments disclosed herein. For example, computer system 1200 may be used to implement any of the cloud server, security operation center, security server, vehicle electronic system, ADCs, and ECUs described above. Computer system 1200 may have a distributed architecture, where some of the components (e.g., memory and processor) are part of an end user device and some other similar components (e.g., memory and processor) are part of a computer server. Computer system 1200 includes at least a processor 1202, a memory 1204, a storage device 1206, input/output (I/O) peripherals 1208, communication peripherals 1210, and an interface bus 1212. Interface bus 1212 is configured to communicate, transmit, and transfer data, controls, and commands among the various components of computer system 1200.

Processor 1202 can include without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. Examples of processor 1202 may include processors developed by ARM®, MIPS®, AMD®, Intel®, Qualcomm®, and the like.

Memory 1204 and storage device 1206 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer-readable storage media can be configured to store instructions or program codes embodying aspects of the disclosure. Memory 1204 and storage device 1206 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with computer system 1200.

Further, memory 1204 includes an operating system, programs, and applications. Processor 1202 is configured to execute the stored instructions and includes, for example, a logical processing unit, a microprocessor, a digital signal processor, and other processors. Memory 1204 and/or processor 1202 can be virtualized and can be hosted within another computing systems of, for example, a cloud network or a data center. I/O peripherals 1208 include user interfaces, such as a keyboard, screen (e.g., a touch screen), microphone, speaker, other input/output devices, and computing components, such as graphical processing units, serial ports, parallel ports, universal serial buses, and other input/output peripherals. I/O peripherals 1208 are connected to processor 1202 through any of the ports coupled to interface bus 1212.

Communication peripherals 1210 are configured to facilitate communication between computer system 1200 and other computing devices over a communications network and include, for example, a modem, a network card, an infrared communication device, a wireless communication device, a near-field communication (NFC) device, and/or a chipset (such as a Bluetooth device, an International Electrical and Electronics Engineers (IEEE) 802.11 device (e.g., a device utilizing one or more of the 802.11 standards described herein), an IEEE 802.15.4 device, a WiFi device, a WiMax device, cellular communication facilities, etc.), and/or the like. Depending on the desired functionality, communication peripherals 1210 can include separate transceivers to communicate with antennas of base transceiver stations and other wireless devices and access points as described above, which may include communicating with different data networks and/or network types, such as wireless wide-area networks (WWANs), wireless local area networks (WLANs), or wireless personal area networks (WPANs). A WWAN may be a network using any air interface technology, for example, a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, W-CDMA, and so on. Cdma2000 includes IS-95, IS-2000, and/or IS-856 standards. A TDMA network may implement GSM, Digital Advanced Mobile Phone System (D-AMPS), or some other RATs. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A WLAN may be an IEEE 802.11x network. A WPAN may be a Bluetooth network, an IEEE 802.15x, or some other type of network. The techniques described herein may also be used for any combination of WWAN, WLAN and/or WPAN.

It should be appreciated that computer system 1200 is illustrative and not intended to limit embodiments of the present disclosure. Many other configurations having more or fewer components than computer system 1200 are possible. The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard or non-standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including, but not limited to, Java®, C, C # or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method of repairing a vehicle, the method comprising:

disabling message authentication in secure communication between any two electronic control units (ECUs) in a plurality of ECUs on the vehicle;

detecting, by a key distribution center on the vehicle and from the plurality of ECUs, a first ECU that has been changed, based on detecting an absence of a valid security key on the first ECU;

verifying that a digital certificate associated with the first ECU is a valid certificate;

generating one or more security keys for secure communication between the first ECU and a set of ECUs in the plurality of ECUs;

provisioning the one or more security keys to the first ECU and the set of ECUs; and enabling the message authentication in secure communication between any two ECUs of the plurality of ECUs.

2. The method of claim 1, wherein the secure communication between any two ECUs in the plurality of ECUs comprises:
generating, by a source ECU in the two ECUs, a message authentication code based on a first security key for communication between the two ECUs;
sending, by the source ECU, the message authentication code and a command to a destination ECU in the two ECUs;
verifying the message authentication code by the destination ECU and using the first security key; and
executing, by the destination ECU, the command after verifying the message authentication code.

3. The method of claim 2, wherein disabling the message authentication in secure communication between any two ECUs in the plurality of ECUs comprises:
executing, by the destination ECU, the command regardless of a result of verifying the message authentication code; or
bypassing the verification of the message authentication code.

4. The method of claim 1, wherein detecting the first ECU that has been changed comprises:
sending, by the key distribution center to the first ECU, an authentication request message that is encrypted or authenticated with the valid security key; and
determining, by the key distribution center, that the first ECU has been changed based on determining that:
an authentication response message is not sent by the first ECU to the key distribution center; or
the authentication response message sent by the first ECU to the key distribution center is not encrypted or authenticated with the valid security key.

5. The method of claim 1, wherein:
the key distribution center stores a security key configuration file, the security key configuration file indicating a number of unique security keys for secure communication between the first ECU and the set of ECUs in the plurality of ECUs; and
generating the one or more security keys comprises regenerating the number of unique security keys.

6. The method of claim 5, wherein the security key configuration file further comprises:
a list of ECUs on the vehicle;
for each respective ECU in the list of ECUs, one or more security keys for secure communication between the respective ECU and other ECUs in the list of ECUs;
one or more groups of ECUs; and
for each respective group of ECUs in the one or more groups of ECUs, a group key for secure communication between any two ECUs in the respective group.

7. The method of claim 6, further comprising updating, in the security key configuration file, values of the one or more security keys for secure communication between the first ECU and the set of ECUs in the plurality of ECUs.

8. The method of claim 1, wherein:
the digital certificate indicates a first security level of the first ECU; and
generating the one or more security keys comprises generating the one or more security keys based on the first security level of the first ECU.

9. The method of claim 8, wherein generating the one or more security keys based on the first security level of the first ECU comprises:

determining that the first security level includes a highest security level; and
generating, for each respective ECU in the set of ECUs and having the highest security level, a unique security key for secure communication between the first ECU and the respective ECU, wherein the unique security key is only used for secure communication between the first ECU and the respective ECU.

10. The method of claim 8, wherein generating the one or more security keys based on the first security level of the first ECU comprises:
determining that the first security level includes a highest security level; and
generating an asymmetric security key pair that includes a public key and a private key,
wherein provisioning the one or more security keys to the first ECU includes saving the private key in a full hardware security module that includes a non-volatile memory device and an asymmetric cryptographic engine on the first ECU.

11. The method of claim 8, wherein generating the one or more security keys based on the first security level of the first ECU comprises:
determining that the first security level includes a highest security level;
selecting, from the set of ECUs, a subset of ECUs that has the highest security level; and
determining a group key for secure communication between the first ECU and each ECU in the subset of ECUs and between any two ECUs in the subset of ECUs.

12. The method of claim 8, wherein generating the one or more security keys based on the first security level of the first ECU comprises:
determining that the first security level includes a medium security level;
determining, from the set of ECUs, a second ECU that has the medium security level; and
determining a group key for secure communication between the first ECU and the second ECU and between the first ECU and a third ECU in the set of ECUs that has a security level higher than the medium security level.

13. The method of claim 8, wherein generating the one or more security keys based on the first security level of the first ECU comprises:
determining that the first security level includes a medium security level;
selecting, from the set of ECUs, a subset of ECUs that has the medium security level or a security level higher than the medium security level; and
determining a group key for secure communication between the first ECU and each ECU in the subset of ECUs and between any two ECUs in the subset of ECUs.

14. The method of claim 8, wherein generating the one or more security keys based on the first security level of the first ECU comprises:
determining that the first security level includes a lowest security level; and
determining a unique security key for secure communication between the first ECU and each ECU in the set of ECUs.

15. The method of claim 1, further comprising:
requesting authorization data from a server,
wherein disabling the message authentication in secure communication between any two ECUs in the plurality of ECUs comprises disabling the message authentication in secure communication using the authorization data.

16. A security system for a vehicle, the security system comprising:
a key distribution center on the vehicle, the key distribution center configured to:
disable message authentication in secure communication between any two electronic control units (ECUs) in a plurality of ECUs on the vehicle;
detect, from the plurality of ECUs, a first ECU that has been changed, based on detecting an absence of a valid security key on the first ECU;
verify that a digital certificate associated with the first ECU is a valid certificate;
generate one or more security keys for secure communication between the first ECU and a set of ECUs in the plurality of ECUs;
provision the one or more security keys to the first ECU and the set of ECUs; and
enable the message authentication in secure communication between any two ECUs of the plurality of ECUs.

17. The security system of claim 16, wherein the key distribution center is configured to detect the first ECU that has been changed by:
sending, to the first ECU, an authentication request message that is encrypted or authenticated with the valid security key; and
determining that the first ECU has been changed based on determining that:
an authentication response message is not sent by the first ECU to the key distribution center; or
the authentication response message sent by the first ECU to the key distribution center is not encrypted or authenticated with the valid security key.

18. The security system of claim 16, wherein the key distribution center is configured to disable the message authentication in secure communication between any two ECUs in the plurality of ECUs on the vehicle by:
bypassing a verification of a received message; or
disregarding a result of the verification of the received message.

19. The security system of claim 16, wherein:
the key distribution center stores a security key configuration file, the security key configuration file indicating a number of unique security keys for secure communication between the first ECU and the set of ECUs in the plurality of ECUs;
the key distribution center is configured to generate the one or more security keys by regenerating the number of unique security keys; and
the key distribution center is further configured to update, in the security key configuration file, values of the one or more security keys.

20. A system comprising:
a processing device; and
a non-transitory computer-readable medium communicatively coupled to the processing device, wherein the processing device is configured to execute program code stored in the non-transitory computer-readable medium and thereby perform operations comprising:
disabling message authentication in secure communication between any two electronic control units (ECUs) in a plurality of ECUs on a vehicle;
detecting, from the plurality of ECUs, a first ECU that has been changed, based on detecting an absence of a valid security key on the first ECU;
verifying that a digital certificate associated with the first ECU is a valid certificate;
generating one or more security keys for secure communication between the first ECU and a set of ECUs in the plurality of ECUs;
provisioning the one or more security keys to the first ECU and the set of ECUs; and
enabling the message authentication in secure communication between any two ECUs of the plurality of ECUs.

* * * * *